Sept. 8, 1964    R. B. WHITE, JR    3,147,839
COIN TESTING AND SORTING MACHINE
Filed March 9, 1959    15 Sheets-Sheet 1

INVENTOR.
ROBY BYRON WHITE, JR.
BY
ATTORNEYS

Sept. 8, 1964  R. B. WHITE, JR  3,147,839
COIN TESTING AND SORTING MACHINE
Filed March 9, 1959  15 Sheets-Sheet 2

INVENTOR.
ROBY BYRON WHITE, JR.
BY
ATTORNEYS

Sept. 8, 1964  R. B. WHITE, JR  3,147,839
COIN TESTING AND SORTING MACHINE
Filed March 9, 1959  15 Sheets-Sheet 3

INVENTOR.
ROBY BYRON WHITE, JR.
BY
ATTORNEYS

Sept. 8, 1964  R. B. WHITE, JR  3,147,839
COIN TESTING AND SORTING MACHINE
Filed March 9, 1959  15 Sheets-Sheet 4

INVENTOR.
ROBY BYRON WHITE, JR.
BY
ATTORNEYS

Sept. 8, 1964 R. B. WHITE, JR 3,147,839
COIN TESTING AND SORTING MACHINE
Filed March 9, 1959 15 Sheets-Sheet 5
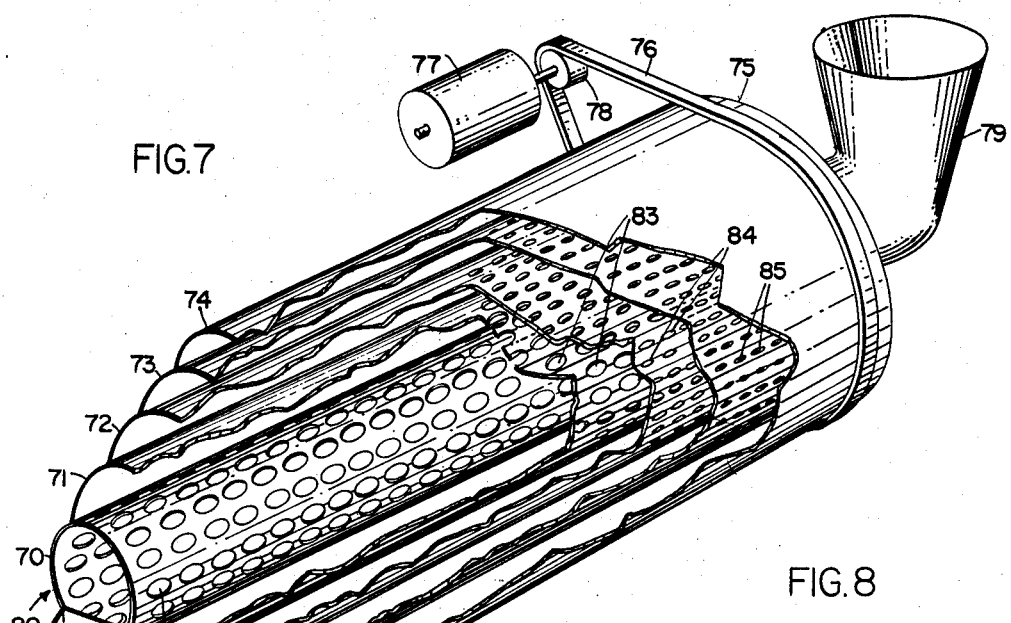
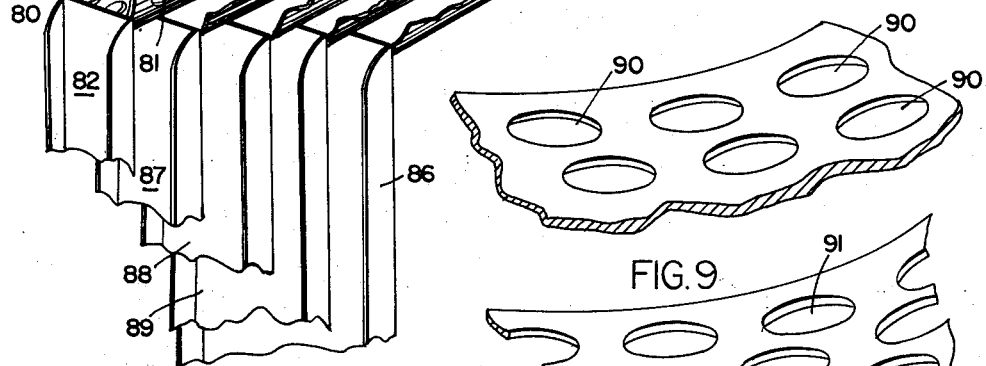
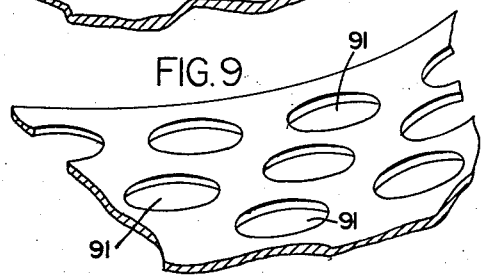
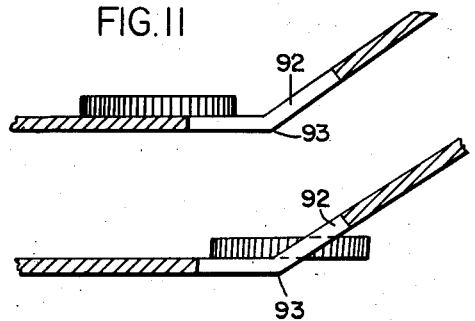
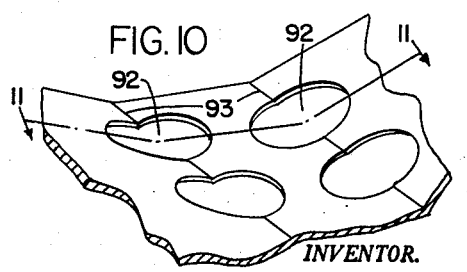
INVENTOR.
ROBY BYRON WHITE, JR.
BY
ATTORNEYS Sept. 8, 1964 R. B. WHITE, JR 3,147,839
COIN TESTING AND SORTING MACHINE
Filed March 9, 1959 15 Sheets-Sheet 6
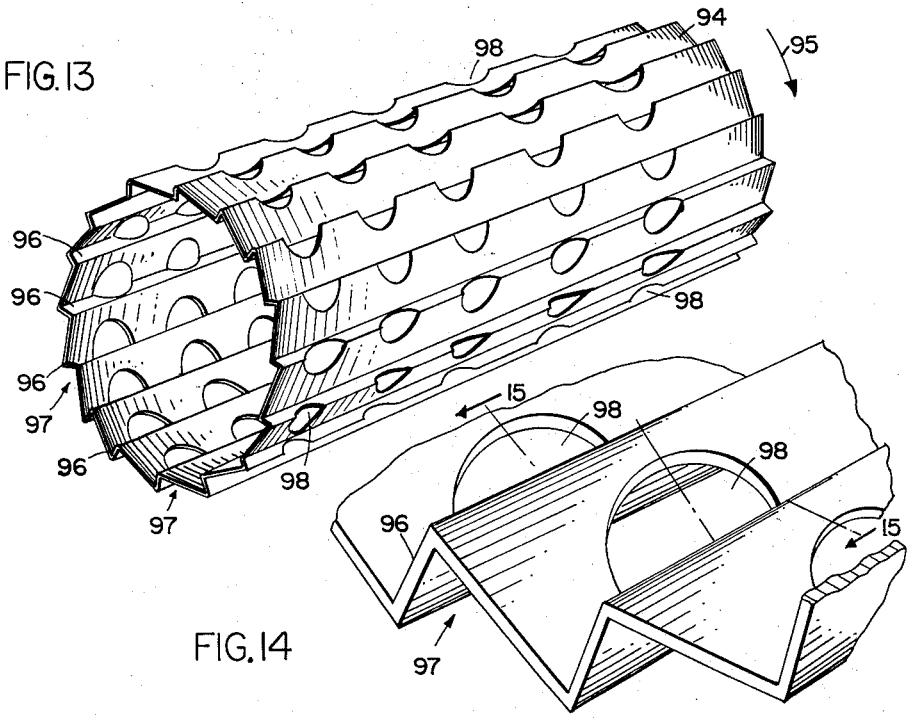
FIG.13
FIG.14
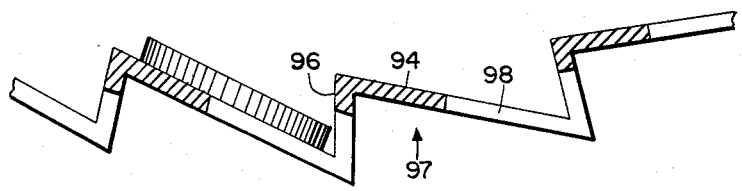
FIG.15
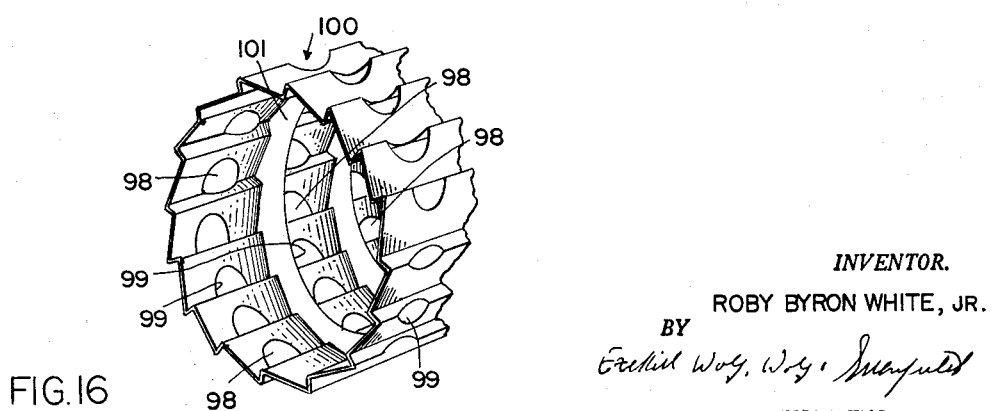
FIG.16
*INVENTOR.*
ROBY BYRON WHITE, JR.
BY
ATTORNEYS

INVENTOR.
ROBY BYRON WHITE, JR.
BY

ATTORNEYS

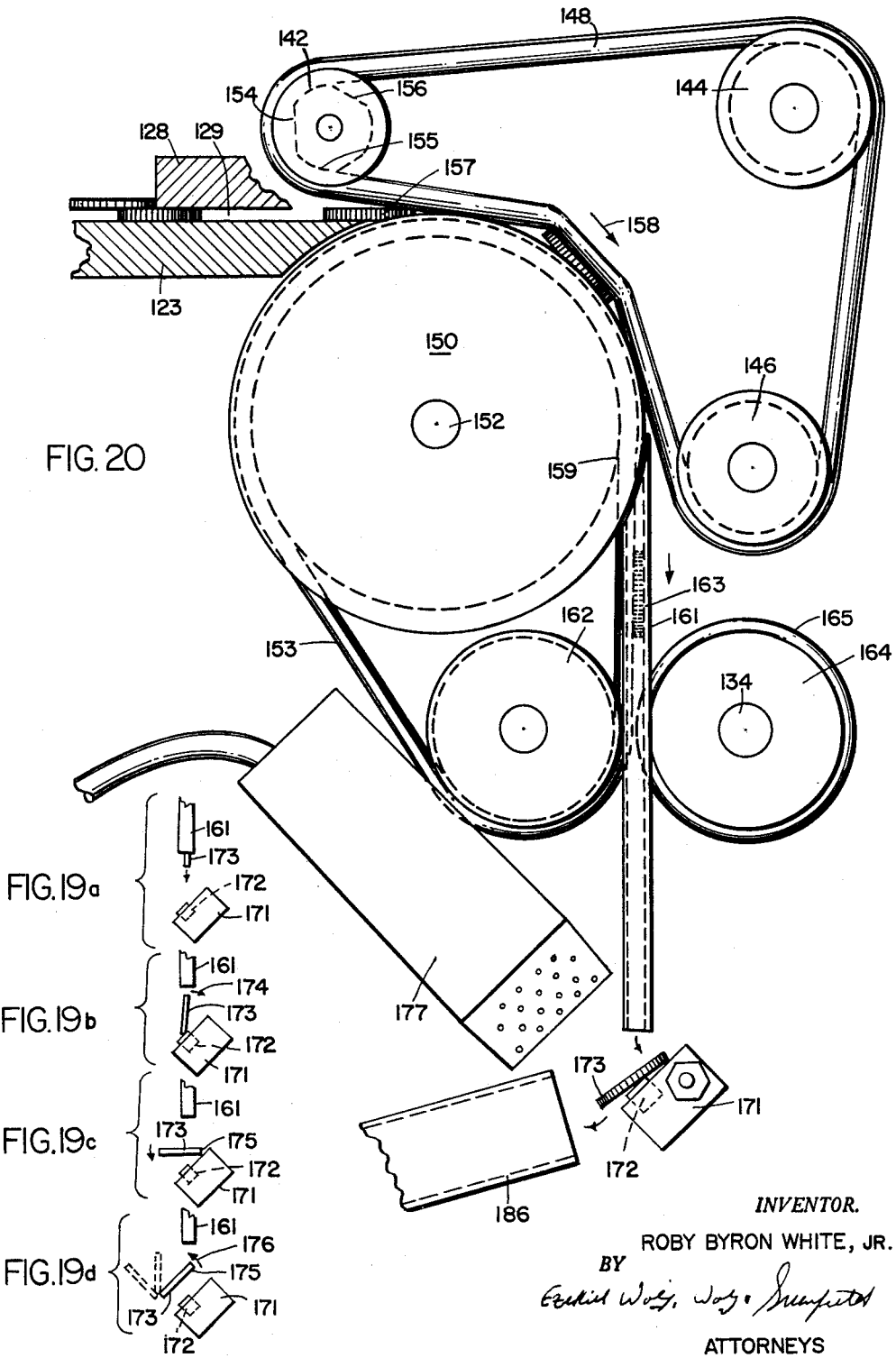

Sept. 8, 1964  R. B. WHITE, JR  3,147,839
COIN TESTING AND SORTING MACHINE
Filed March 9, 1959  15 Sheets-Sheet 10

INVENTOR.
ROBY BYRON WHITE, JR.
BY
ATTORNEYS

Sept. 8, 1964 R. B. WHITE, JR 3,147,839
COIN TESTING AND SORTING MACHINE
Filed March 9, 1959 15 Sheets-Sheet 11

*INVENTOR.*
ROBY BYRON WHITE, JR.
BY
ATTORNEYS

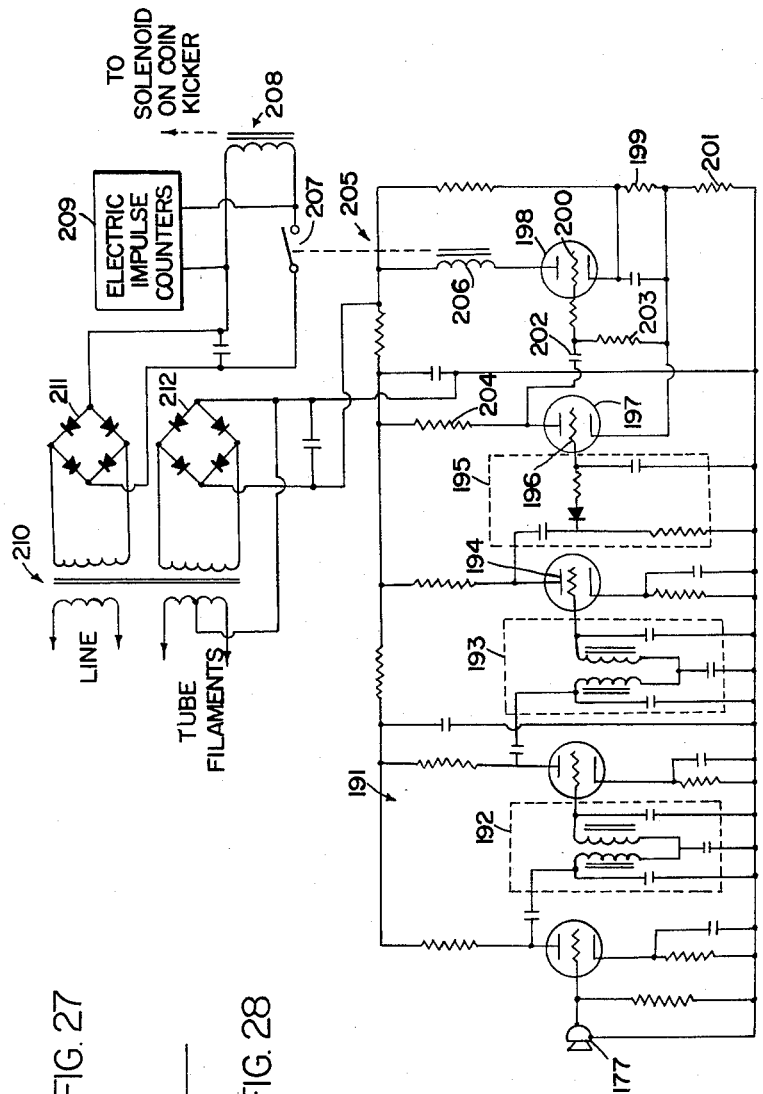

Sept. 8, 1964     R. B. WHITE, JR     3,147,839
COIN TESTING AND SORTING MACHINE
Filed March 9, 1959     15 Sheets-Sheet 13

*INVENTOR.*
ROBY BYRON WHITE, JR.
BY
ATTORNEYS

Sept. 8, 1964    R. B. WHITE, JR    3,147,839
COIN TESTING AND SORTING MACHINE
Filed March 9, 1959    15 Sheets-Sheet 14
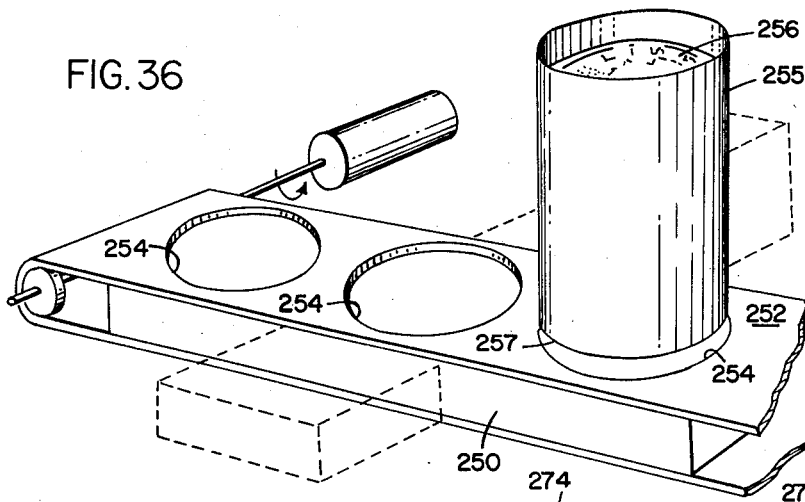
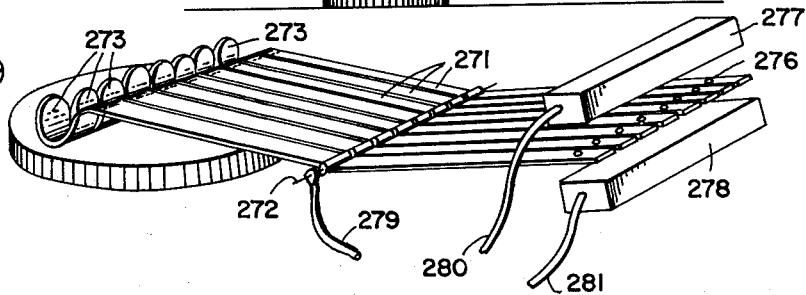
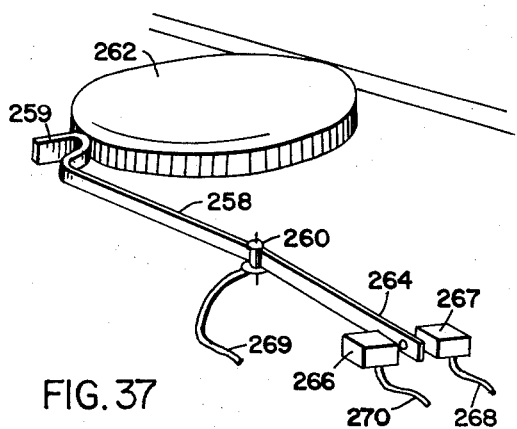
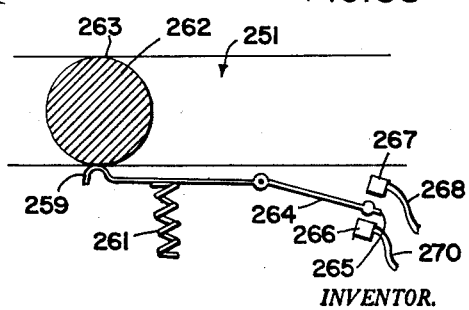
INVENTOR.
ROBY BYRON WHITE, JR.
BY
Ezekiel Wolf, Wolf r Greenfield
ATTORNEYS Sept. 8, 1964    R. B. WHITE, JR    3,147,839
COIN TESTING AND SORTING MACHINE
Filed March 9, 1959    15 Sheets-Sheet 15

INVENTOR.
ROBY BYRON WHITE, JR.
BY
ATTORNEYS

United States Patent Office 3,147,839
Patented Sept. 8, 1964

3,147,839
COIN TESTING AND SORTING MACHINE
Roby B. White, Jr., Sharon, Mass., assignor, by mesne assignments, to Electronic Coin Processing Corp., New York, N.Y., a corporation of Delaware
Filed Mar. 9, 1959, Ser. No. 798,264
12 Claims. (Cl. 194—100)

This application relates to coin processing devices. More particularly the invention disclosed herein comprises a new and improved coin sorting, authenticating and accounting machine.

My invention is particularly suited for use by such organizations as telephone companies, transit authorities, vending machine operators, banks, parking meter operators, etc. which handle large quantities of coin. At the present time such organizations authenticate and count coins either manually or semi-automatically which are very slow and tedious processes. Typically, coins from telephone pay stations are processed by telephone companies in the following manner. The coins are removed from the telephones in individual boxes which are carried to a central accounting office. At these offices, the boxes are individually opened, and their contents spread out on small tables and inspected manually to separate the counterfeit from the authentic coins. Thereafter, the authentic coins are counted by machines provided for this purpose. Each telephone station must be credited with the dollar value of the authentic coins received by it so that the proprietor of the premises may receive his commission.

In the telephone system, my invention may be used in several ways. As a portable assembly, it may be taken to the site of each station and coins removed from the individual telephones may be proved and counted at or adjacent the premises. Alternatively, the assembly may be located at the central accounting office and receive the contents of the individual boxes as they are brought to the accounting office from the separate stations. By the use of my assembly, individual handling of the coins may be totally eliminated even to the extent of making the bookkeeping entries and drawing the lease or commission checks to the proprietors where the stations are located. This completely automatic handling is made possible because the machine may readily be connected to a conventional punch card process with no intermediate manual steps.

My portable assembly may also be used to collect coins from parking meters in a manner similar to that described above in connection with the removal of coins from individual telephone stations. For this purpose, a pick-up system is provided which is adapted to extract coins from parking meters and feed them automatically into the coin handling machine. This is carried out in a manner which is in effect pilfer proof.

My invention includes various subassemblies which may be arranged in various orders depending upon the particular application for the device. The subassemblies include a pick-up device for introducing coins to the assembly, a sorting mechanism for separating coins of various denominations according to size, a proving device for determining the authenticity of the coins of each denomination, a device for separating authentic but mutilated coins from those in good condition, and a counting mechanism for totaling the coins of each denomination and those rejected as mutilated.

Obviously, the various subassemblies may be used in different combinations. For example, the portable assembly used to collect coins from telephone stations and parking meters would include a pick-up device for introducing coins to the unit, a sorter for separating the coins of different denomination received by the meters or telephone stations, provers for testing the authenticity of the coins of each denomination received, and the counting mechanism for totaling the value of the coin received. Banks may have several assemblies each one consisting of a sorter, a single prover for the denomination of coin being handled, a mutilated coin rejector, and a counter.

It will be obvious from the following detailed description that each of the individual subassemblies have applications distinct from their use in combination with the other subassemblies of the device or machine. For example, the pick-up device may be used alone for the collection of coins from any source where counting or proving is not required.

My invention will be better understood and appreciated from the following detailed description, read in connection with the accompanying drawing, in which:

FIGURE 7 is a fragmentary view partly in section of the coin sorting subassembly employed in the embodiments of FIGURES 1 and 2;

FIGURES 8–10 are fragmentary views in prospective illustrating different cylindrical forms which may be used in the sorter of FIGURE 7;

FIGURES 11 and 12 are cross sectional views taken along section line A—A of FIGURE 10 showing successive positions of a coin sorted by the cylinder;

FIGURE 13 is still another embodiment of cylinder which may be used in the sorter of FIGURE 7;

FIGURE 14 is an enlarged detailed view of the cylinder in FIGURE 13;

FIGURE 15 is a cross sectional view taken along the section line A—A in FIGURE 14;

FIGURE 16 illustrates a modification of the cylinder or drum shown in FIGURE 13;

FIGURES 19a–19d illustrate the sequence of positions of a coin handled by the mechanism of FIGURE 18;

FIGURES 20–24 are detailed views of the mechanism shown in FIGURE 18;

FIGURE 26 is a schematic diagram of the electrical system of the prover shown in FIGURE 16;

FIGURES 27 and 28 illustrate the form of the signal in different stages of the electrical system shown in FIGURE 26;

FIGURE 35 is a prospective view of a mechanism used to detect physical abnormalities in coins handled by any of the subassemblies of the coin handling mechanism;

FIGURE 36 is a fragmentary prospective view of the pick-up mechanism employed with the subassembly of FIGURE 35;

FIGURE 37 is a detailed prospective view of the mechanism used to detect abnormalities in the diameters of coins in the mechanism of FIGURE 35;

FIGURE 38 is a plan view of the mechanism shown in FIGURE 37;

FIGURE 39 is a fragmentary prospective view of the mechanism used to detect abnormalities in the thicknesses of coins in the mechanism of FIGURE 35;

FIGURE 40 is an elevation view of the mechanism shown in FIGURE 39;

Figure 1:
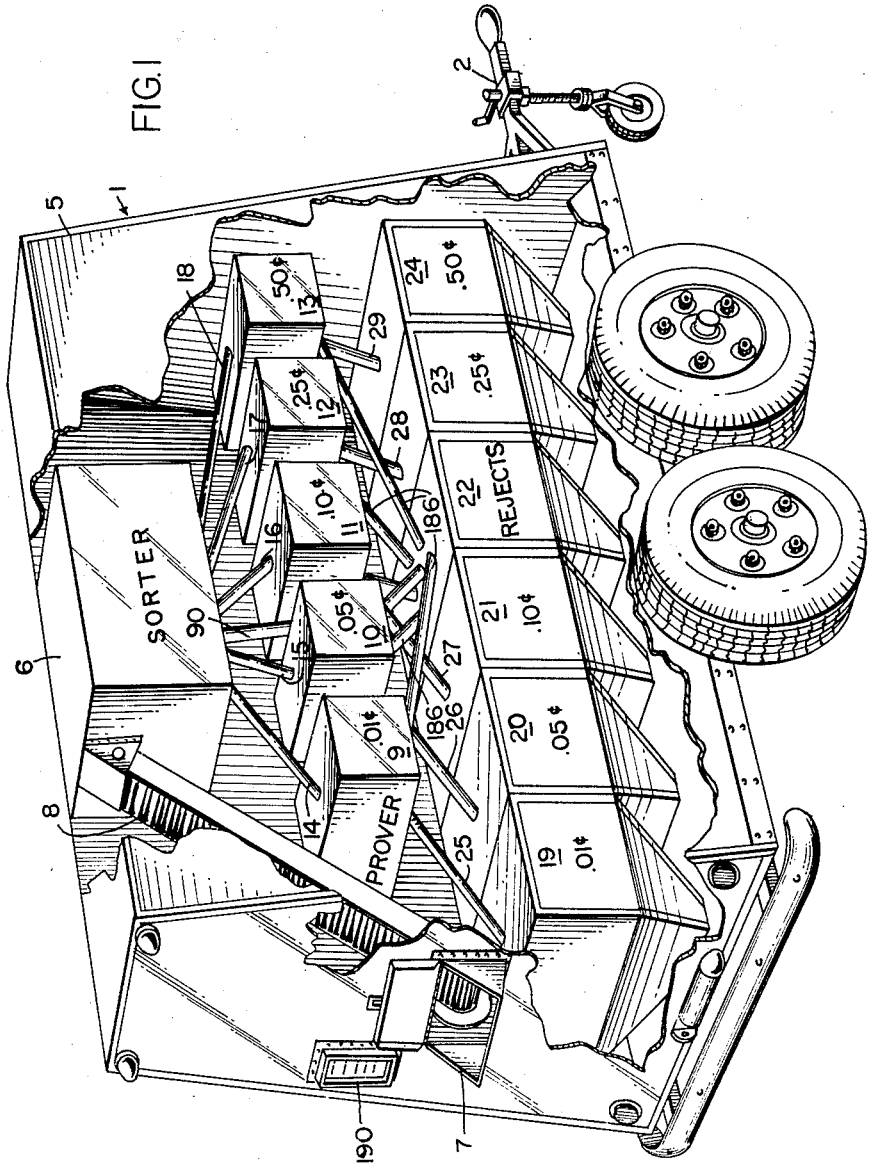
FIGURE 1 is a prospective view of a trailer containing a coin handling assembly constructed in accordance with my invention.
Figure 2:
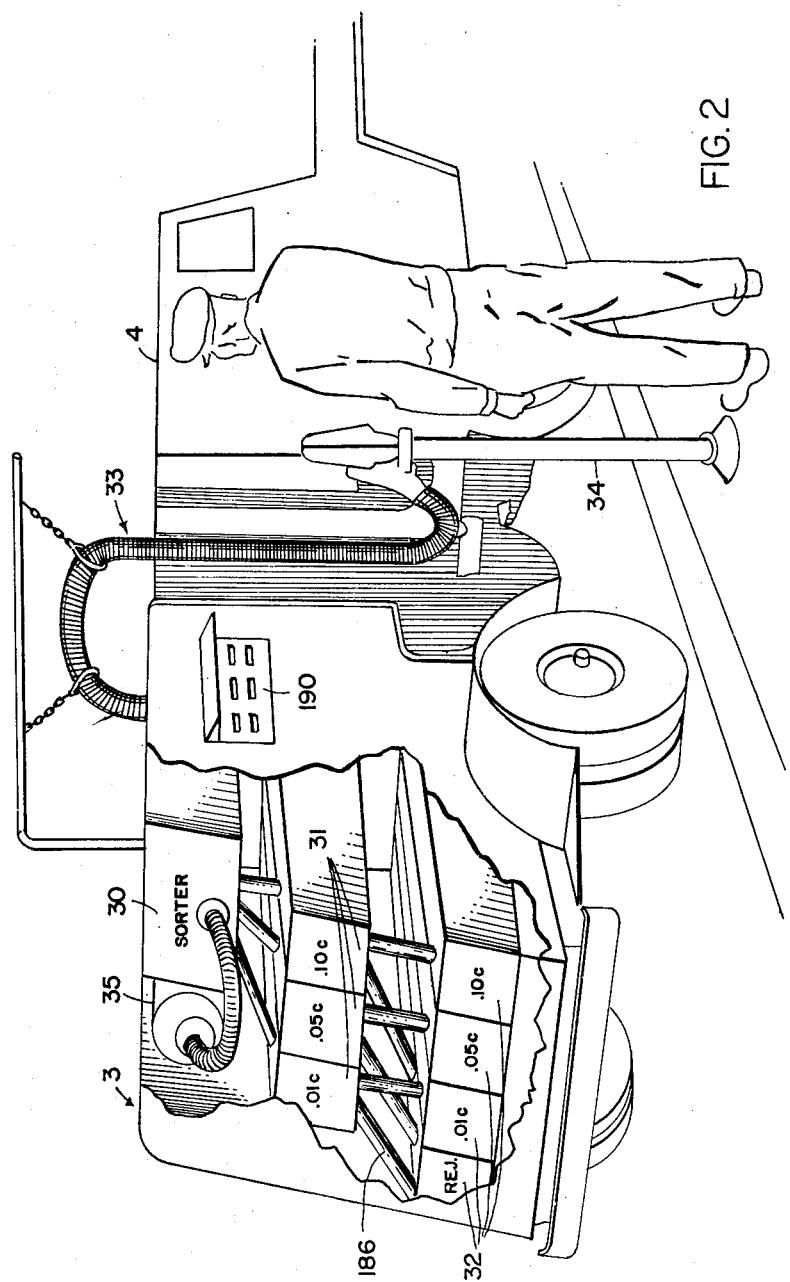
FIGURE 2 is another embodiment of a portable coin processing assembly particularly suited for use for extracting and handling coins from parking meters.

The embodiments of my invention shown in FIGURES 1 and 2 are each made portable in that the several subassemblies are incorporated into vehicles. In the embodiment of FIGURE 1, the coin handling apparatus is incorporated into a trailer 1 having a hitch 2 adapted to engage any form of cab. In the embodiment of FIGURE 2, the mechanism is disposed in the trailer or van 3 of a truck 4. Obviously the coin handling apparatus may be made portable by mounting it in any type of vehicle.

In the embodiment of FIGURE 1 the apparatus is capable of handling coins of all denominations. Thus, disposed in the compartment 5 is a sorter 6 which is adapted to separate coins according to size and thus in effect divide all of the coins fed to it into groups of different denomination. Coins are fed to the sorter 6 through the hopper 7 formed in the side of the compartment and are carried by a conveyor 8 to the sorter. As will become apparent below, after the coins have been brought to the sorter by the conveyor 8, they are gravity fed to the various other subassemblies which process the coins.

It will be noted in FIGURE 1 that disposed beneath the sorter 6 are five provers 9, 10, 11, 12 and 13 each adapted to receive coins of a particular denomination. Thus, prover 9 will receive pennies from the sorter, prover 10 will receive nickels, prover 11 dimes, prover 12 quarters, and prover 13 half-dollars. Chutes 14, 15, 16, 17 and 18 are provided to carry the coins separated by the sorter into the respective provers.

While the sorter 6 merely serves to separate the coins according to size and direct them to the separate provers, the provers serve to test the authenticity of each coin directed to them. That is, the sorter will pass a coin to a prover just so long as the coin is of the approximate dimensions of an authentic coin, and the sorter does not include apparatus for otherwise recognizing counterfeits. The provers, however, cause the coins to resonate at their natural resonant frequency in free air in a half wave circular mode and recognize counterfeits which do not ring within a preselected frequency band width.

Disposed beneath the provers are six bins 19, 20, 21, 22, 23 and 24. Bin 19 is connected by a chute 25 to the prover 9 and will receive authentic pennies from that prover. Similarly, chutes 26, 27, 28 and 29 direct authentic nickels, dimes, quarters and half-dollars from the other provers to the appropriate bins. It will also be noted that each prover has a second chute which terminates in the bin 22 identified as containing counterfeits or rejects. Thus, coins found to be counterfeits by the provers are all directed to the special bin and are separated from the authentic coins contained in the other bins.

The trailer or van 3 shown in FIGURE 2, unlike the trailer in FIGURE 1, is adapted to handle coins of only three denominations. As will be explained in detail below, the arrangement shown in FIGURE 2 is particularly adapted to collect coins from parking meters and thus it is unnecessary for the apparatus to handle quarters and half-dollars. Rather, only pennies, nickels, and dimes which are normally accepted by parking meters need be received by the apparatus. Briefly, the trailer 3 contains a sorter 30, three provers 31 and four bins 32. It will be noted that one of the bins receives rejects while each of the other three bins receive authentic coins from their respective provers.

The trailer 3 also is provided with a coin pick-up assembly 33 which is adapted to gather coins from a parking meter 34 and direct them into the prover 30. A pumping device 35 disposed in the trailer 3 forms part of the pick-up subassembly.

In FIGURES 1 and 2 each of the subassemblies is illustrated in generally box form. In the following sections, the details of each mechanism will be described fully and thereafter, the operation of the entire coin handling machinery will be presented.

Figure 4:
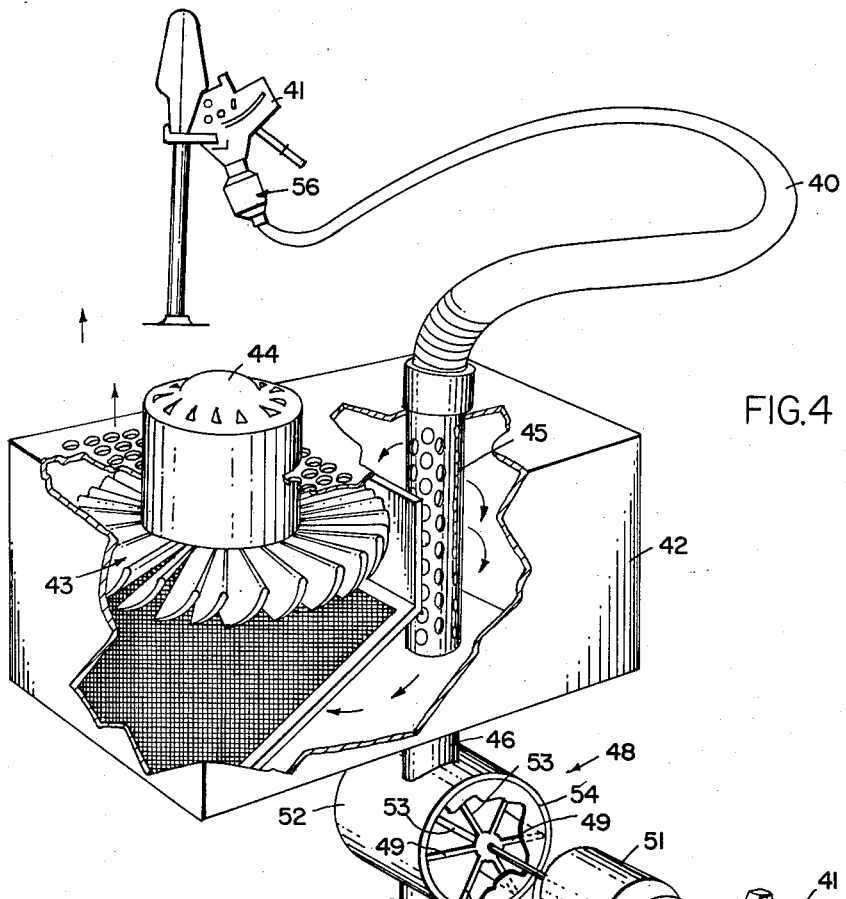
FIGURE 4 is a prospective view of the vacuum coin pick-up subsystem employed in the portable assembly of FIGURE 2 and illustrating the manner in which coins are removed from a parking meter and directed into the truck.
Figure 5:
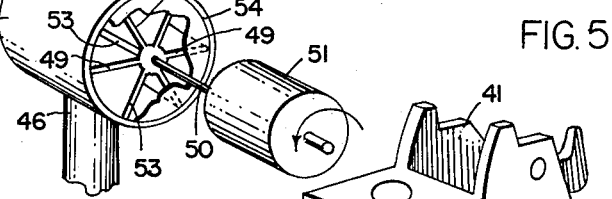
FIGURE 5 is a prospective view of the coin collecting head shown in FIGURE 4.
Figure 6:
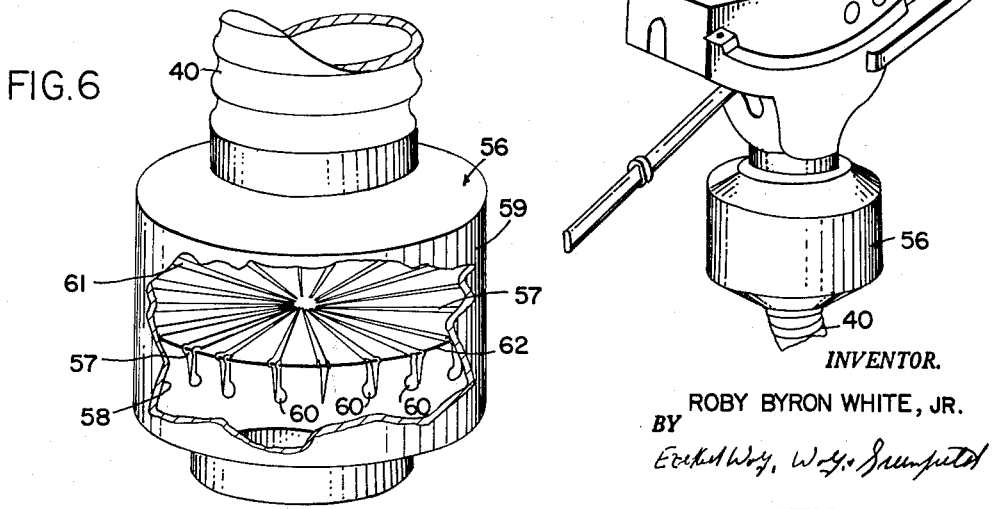
FIGURE 6 is an enlarged detail view, partially in section, of a portion of the assembly shown in FIGURE 4.

Coin Pick-Up Mechanism (FIGURES 4–6)

In FIGURES 4–6 I have illustrated the coin pick-up subassembly used in the trailer 3 shown in FIGURE 2. This mechanism is particularly adapted to remove coins from parking meters and direct them into the sorter 30.

A flexible hose 40 made of plastic, rubber or other similar material interconnects a coin receiving head 41 and a housing 42. The coin receiving head 41 per se does not form part of my invention and may take any one of several forms. The head should be adapted to engage a standard parking meter such as shown at 34 in FIGURE 2, open the meter drawer (not shown), and dump the coins into the tube. The better devices of this type are pilfer proof in that no access to the drawer is available when the head engages the meter. Typically, the head may take the form of the coin collecting device shown in the Jones Patent No. 2,779,535, dated January 29, 1957. It is intended that the disclosure contained therein be incorporated by reference into this application.

Within the housing 42 is a standard impeller or suction pump 43 driven by a motor 44 which is adapted to create a flow of air from the coin pick-up head 41 through the hose 40 into the housing 42. The suction action of the impeller 43 is transferred into the hose 40 through the perforated cylinder 45 which extends through the housing 42 and communicates with the hose. The perforations in the cylinder 45 are smaller than any coin and thus while coins are carried through the hose 40 by the air flow from the pick-up head 41, they are not permitted to discharge into the housing 42 but rather are confined to the cylinder 45. Having reached this cylinder, the coins drop by gravity into the chute 46. A screen 47 disposed beneath the impeller 43 prevents small pellets or other matter from impinging upon the impeller blades and damaging them. Any such extraneous matter drawn into the system by the impeller is confined to the housing 42, and may be periodically removed from it.

The valve 48 which interrupts the chute 46 is specially designed so as not to adversely affect the suction action of the impeller 43 in the tube 40. That is, the valve 48 is designed to prevent any appreciable flow of air up the chute 46 into the housing which would satisfy the suction action of the impeller. The valve includes a plurality of radial vanes 49 carried on the shaft 50 of the motor 51. The outer edges of the vanes 49 have a very close tolerance with the inner surface of the cylindrical case 52 of the valve 48 and the side edges 53 of the vanes bare against the end walls 54 of the case. The motor 51 drives the vanes very slowly to prevent any appreciable quantity of air from being fed into the upper portion of the chute 46. As the coins drop through the cylinder 45 and the chute 46, they are directed into the V-shaped troughs formed between adjacent pairs of radial blades 49. As these troughs turn with the rotation of the shaft 50, they are ultimately placed in alignment with the bottom portion of the chute 46, and the coins are permitted to fall into that portion and be directed into the next subassembly of the coin handling machine.

In FIGURE 6 I have illustrated an anti-pilferage safety device disposed immediately adjacent the pick-up head 41 in FIGURES 4 and 5. It will be noted in FIGURE 6 that the device is inverted with respect to the showing in the other figures. This has been done to illustrate the action of its various components.

The safety device is embodied in a cylindrical housing 56. Several fingers 57 are pivoted on the support 62 adjacent the inner surface 58 of the cylindrical wall 59 of the housing and have weighted heads 60 which control the position of the inwardly extending blades 61. As stated above, the anti-pilferage device is shown in FIGURE 6 in its inverted form. The device is designed to prevent coins which have passed into the flexible hose 40 from being shaken out of the hose through the head 41 by inverting the inlet end of the hose. The blades 61 carry overlapping webs which together fill the cross section of the housing 56 when it is inverted. These webs have been omitted from the drawing for purposes of clarity and it is to be understood that they in fact do exist and form a solid disc across the diameter of the housing. When the device is inverted, the weights 60 at the ends of each of the fingers seek the low position as illustrated in FIGURE 6 and the blades 61 rise up in the cylinder to the horizontal plane. However, when the device is in an upright position as illustrated in FIGURES 4 and 5, the weights under the influence of gravity will swing inwardly toward the center of the housing 56 seeking a low position and cause the fingers 57 to pivot about their support 62. Thus, the blades 61 and their webs (not shown) will fall against the side of the cylindrical wall 59 out of the way and not impede the flow of the coins. The weights 60 which are much shorter than the blades will not fill the cross section of the housing and retard their flow. From this description, the reader will appreciate that once coins have entered the tube 40, it is impossible for an operator to remove the coins from the tube without actually removing the head 41 and the housing 56.

*Sorter Subassembly (FIGURES 7-17)*

The sorter illustrated in FIGURE 7 is adapted to separate coins of all denomination. That is, pennies, nickels, dimes, quarters and half-dollars may be handled by it and be directed to separate provers. Thus, the sorter may be used particularly in the arrangement shown in FIGURE 1. In FIGURE 7, the mechanism includes five concentrically mounted drums 70, 71, 72, 73 and 74 secured together at one end 75 by a web or similar means (not shown). The five concentrically mounted drums are rotated together about the common axis by a belt 76 which extends about the outer drum 74. The belt 76 is in turn driven by a motor 77 and its pulley 78. The relative diameters of the pulley 78 and the outer drum 74 provide the speed reduction necessary. Obviously, any other arrangement may be used to impart rotation to the drums.

The five concentrically arranged drums are specifically designed to separate the different denominations of coin, that is, pennies, nickels, dimes, quarters and half-dollars. All but the outer drum 74 are covered with a lattice of perforations and the perforations in each drum are sized to pass all but the largest size of coins fed to it.

Coins are introduced into the drum assembly through a hopper 79 which terminates at the inner drum 70 at the end 75. The common axis of the drums is somewhat inclined, being lower at the end 80 and coins fed into the rotating drums will move by gravity from the hopper 79 toward the end 80.

The perforations 81 formed in the drum 70 are large enough to pass pennies, nickels, dimes and quarters but are insufficient in size to allow half-dollars to pass through them. Thus, half dollars introduced into the drum 70 by the hopper will be carried by gravity to the end 80 of the assembly and slide down the chute 82. Similarly, the drum 71 is covered with openings 83 which will not pass quarters but are large enough to pass pennies, nickels, and dimes. The holes 84 in drum 72 will not pass nickels, but will allow pennies and dimes to fall into the drum 73. The holes 85 in drum 73 will retain pennies but will allow dimes to pass into the outer drum 74. The drum 74 is imperforate, and, therefore, all coins which pass to it, namely, dimes and small slugs will be discharged from it by the chute 86. It will be noted that drums 71–73 are also provided with discharge chutes 87, 88 and 89, respectively.

Although the outer drum 74 is illustrated and described as being imperforate, it should be understood that it also may be perforated to pass coins smaller than dimes to still another drum. In this manner, obviously small counterfeit coins may be separated from other coins which at least approximate the size of authentic coins. Such an arrangement is suggested in FIGURE 1 wherein a chute 90 exends directly from the sorter 6 into the reject bin 22. Obviously, such coins which are smaller than authentic dimes need not be proved and thus can by-pass the prover stage and pass directly to the reject bin.

The orientation of the perforations and the drums may take any of several forms. Various forms of each are suggested in FIGURES 8-16. In FIGURE 8, it will be noted that the holes 90 are aligned both longitudinally and circumferentially about the drum while in FIGURE 9, the holes 91 are arranged in staggered circumferential rows to increase their density. As between the embodiments of FIGURES 8 and 9, the latter is preferred, for obviously, a drum with such an arrangement will have a greater capacity.

In FIGURES 10–12, another embodiment of the drum is shown. In this embodiment, the drum is formed as a polygon rather than round in cross section and the openings or holes 92 lie on the corners 93 of the polygon. That is, the transverse diameters of the openings with respect to the axis of the drum are coincident with the joints or corners of adjacent surfaces. The advantage of such an arrangement is shown in FIGURES 11 and 12. While in the embodiments of FIGURES 8 and 9, a coin must drop through the openings 90 or 91, that is, its sides must in effect align themselves with the periphery of an opening, as the coin slides over the inner surface of the drum in the embodiment of FIGURES 10–12, a coin may slide out of the drum through the openings 92 without a change in its direction of motion relative to the drum. This action is suggested in FIGURES 11 and 12.

While each of the embodiments of FIGURES 8–10 are adequate to handle the sorting operation in most applications, it will be appreciated that difficulties may occur when a great volume of coins are to be sorted. When great numbers of coin are contained within a single drum, as the drum rotates, the coins pile up on one another at the lowermost part of the drum and only the coins which lie against the surface of the drum have an opportunity to pass through the openings to the next outer drum. To avoid this difficulty, a tumbling action may be introduced to distribute the coins more evenly about the inner surface of the drum and avoid particular coins from riding on the top of a pile throughout the sorting action. In the embodiment of FIGURES 13–16, this tumbling action is accomplished by providing the cross section of the drum 94 with a saw tooth configuration. Note that the arrow 95 in FIGURE 13 suggests the direction in which the drum turns. The leading side 96 of each tooth 97 serves as a support to carry the coins up the side of the drum. When the supporting surface 96 of the folds in the drum which define the saw tooth cross section become inclined in a downwardly direction, toward the center of the drum 94, the coins will fall or slide off these surfaces and the tumbling action results. Thus, coins are not allowed to build up on top of large coins or remain on the top of piles of coins but are continuously churned by the tumbling action.

It will be noted that the openings 98 formed in the drum are intersected by the bases of the leading sides 96 of the saw tooth sections and thus, the coins are allowed to slide out of the openings in the manner suggested in FIGURE 15. It will be appreciated that this action is substantially identical to that illustrated in FIGURES 10 and 12.

In FIGURE 16, an additional modification is suggested. Adjacent the low side 99 of each of the circumferential rows 100 of perforations 98, ribs 101 are formed which retard the longitudinal travel of the coins in the drum. These ribs which lie immediately adjacent the edges of the circumferential rows 100 of the holes align the coins with the perforations 98. As a result, those coins which are of a size to pass through the openings will be directed to the openings to hasten the sorting action.

Figure 17:
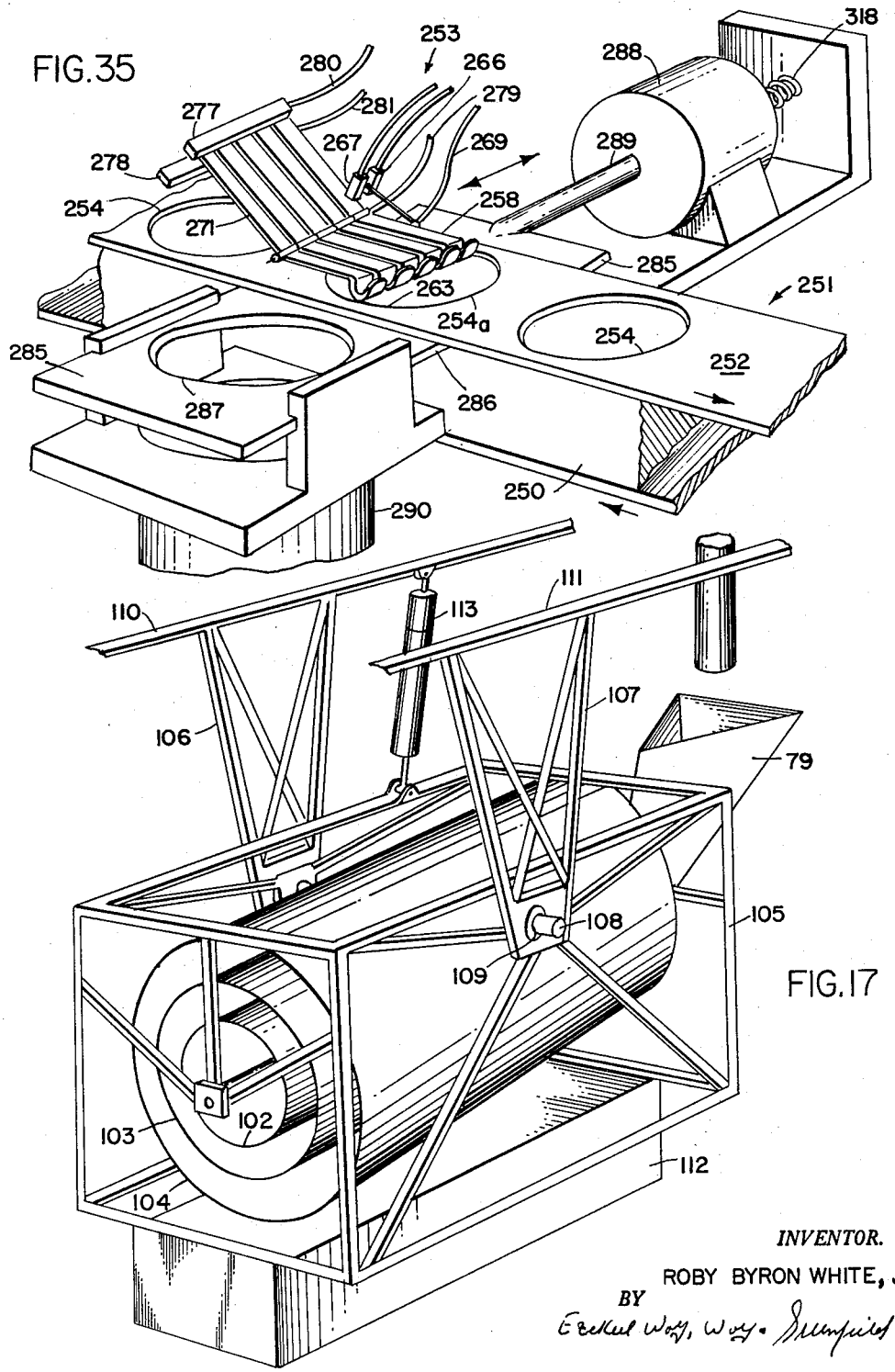
FIGURE 17 is a diagrammatic prospective view of the sorter of FIGURE 4 and shows the manner in which it may be mounted in a portable carrier.

It is clear from the above description that the common axis of the several drums of the sorter should be maintained at an angle to the horizontal for the coins to move through them and out on their respective chutes. Moreover, the angle should not be so great as to cause the coins to complete their travel through the drums without being exposed to the openings. This presents some problems when the sorter is mounted in a moving vehicle which in normal use will travel over varying grades and be subjected to sudden bumps. In FIGURE 17, a support for the sorter is shown which will solve these problems.

The sorter having three concentric drums 102, 103 and 104 properly perforated are carried in a frame 105 which forms a cage for the device. (It may be noted that a three drum sorter is suitable for use in the van of FIGURE 2 wherein coins of but three denominations are handled.) The cage 105 is suspended from a pair of arms 106 and 107 by means of studs 108 which extend through openings 109 in the lower ends of the arms. The common axis of the drums is maintained at an angle to the horizontal center line of the cage and the cage is free to pivot on the arms as the arms move with the changes of inclination of the van. That is, the arms 106 and 107 are rigidly secured by beams 110 and 111 to the van compartment while the cage is pivotally suspended on the arms. A weight 112 on the bottom of the cage 105 serves to lower the center of gravity of the cage and sorter to steady the assembly in the position illustrated with the frame or cage disposed in a horizontal plane and the sorter somewhat inclined with respect to that plane.

A damper 113 which may be spring loaded or include a liquid dash pot is secured between the cage 105 and the beam 110. This damper serves to eliminate the effects on the orientation of the sorter of any sudden bouncing or other shock to which the van may be subjected. Thus, only real changes in grade over which the van travels will cause the cage to move relative to the arms 106 and 107 to maintain the desired position for the sorter.

*Coin Proving Subassembly (Figures 18-25)*

The coin prover shown in detail in FIGURES 18–25 is one of a number of such provers in the trailer 1 and the van 3 of FIGURES 1 and 2, respectively. Each prover is adapted to test the authenticity of coins of one denomination. It will be noted that the prover of FIGURE 18 includes a coin receiving bin or hopper 120 which receives the coins to be authenticated. One of the chutes exiting coins from the sorter will direct coins of one denomination into the bin. The other chutes leading from the rotating drums of the sorter will direct coins to the bins of other provers.

The coin receiving bin 120 includes an upstanding cylindrical wall 121 supported on a frame 122 and a rotating plate or bed 123. The plate 123 is provided with an upstanding centrally located hub 124 which serves to spread the coins about the periphery of the plate. The plate 123 is rotated about the axis of the hub by a motor 125 through the worm 126 on the motor shaft and a gear 127 mounted on a vertical shaft (not shown) which supports the plate. The disc or plate 123 rotates at a speed of approximately 80 r.p.m.

Figure 24:
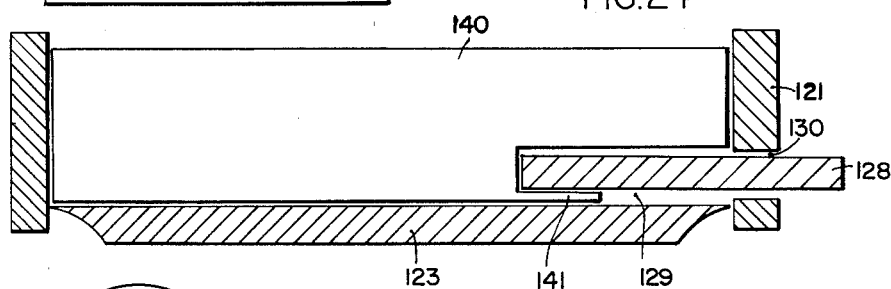

A second rotating disc 128 disposed above the plane of the disc 123 a distance slightly greater than the thickness of the denomination of coin to be proved cooperates with it to define a passage 129 through which the coins are directed one at a time from the bin 120. This passage is shown in FIGURE 24. It will be noted in that figure that the disc 128 overlies the periphery of disc 123 and extends through an opening 130 in the cylindrical wall of the bin. The disc 128 rotates at approximately 300 r.p.m. for reasons which will be described below.

Figure 21:
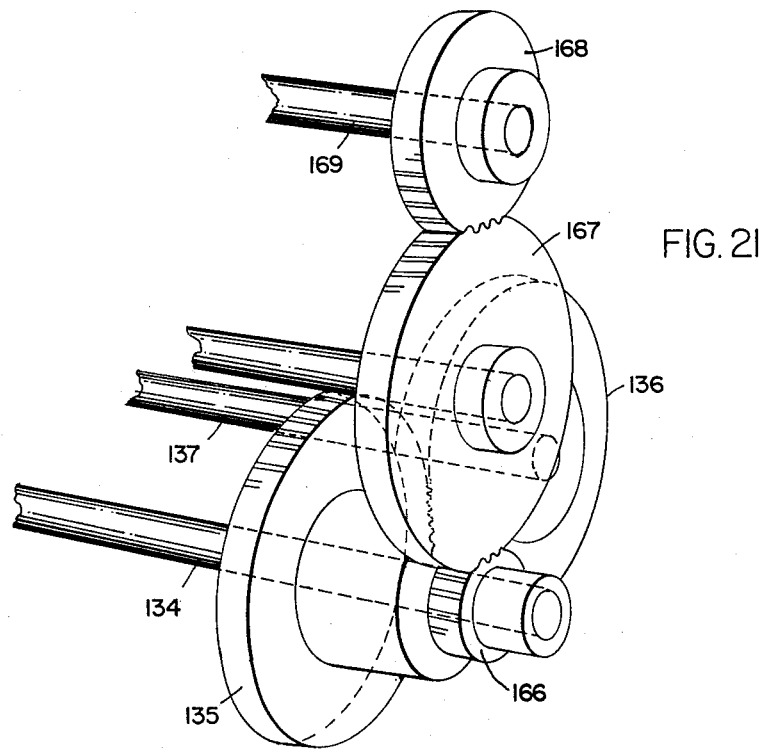
Figure 25:
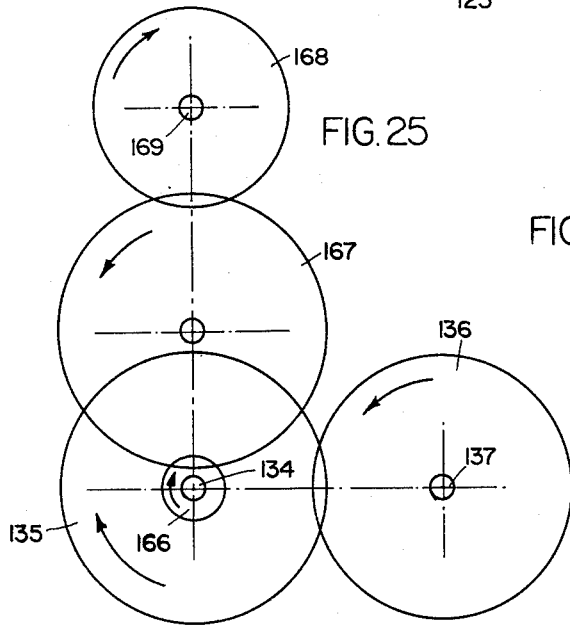
FIGURE 25 is a diagrammatic view of the gear train shown in FIGURE 21.

The disc 128 is driven in the following manner. The shaft of motor 135 carries a pulley 131 which drives a belt 132. The belt 132 drives a second pulley 133 mounted on a shaft 134 which also carries a gear 135. As shown in FIGURES 21 and 25, the gear 135 drives a second gear 136 mounted on a separate shaft 137. A beveled gear 138 disposed adjacent the pulley 133 at the other end of the shaft 137 meshes with a second gear (not shown) disposed at 90° to it and mounted on the shaft 139 which supports the disc 128 and provides the immediate drive for it. The gear train described above is specially designed to achieve the stated speed of approximately 300 r.p.m.

Figure 22:
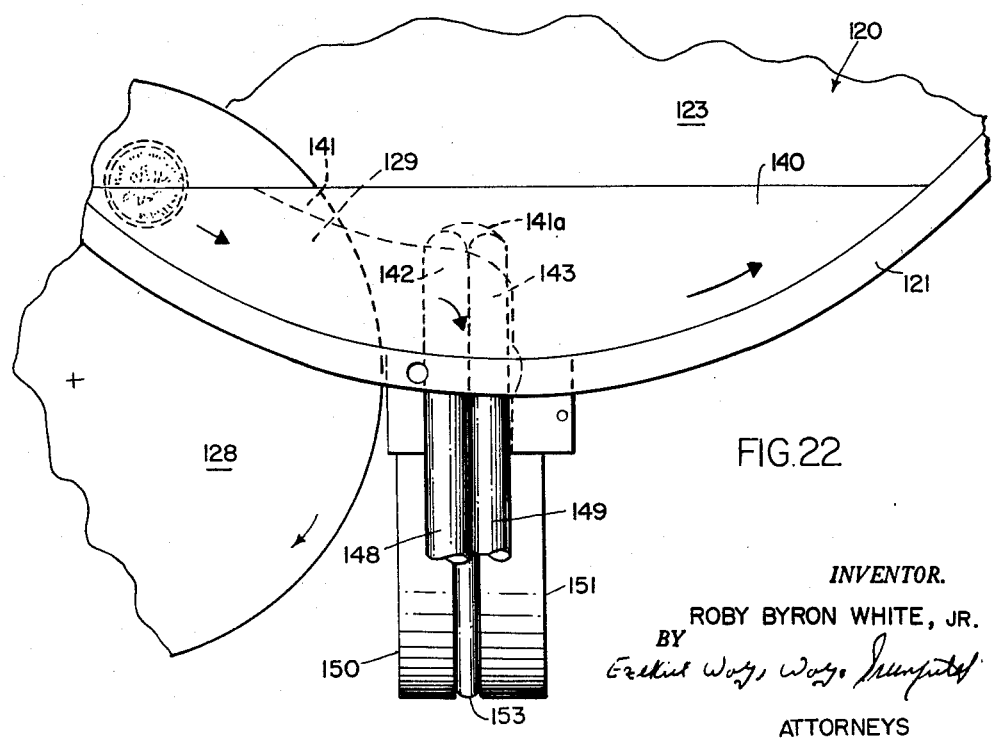
Figure 23:
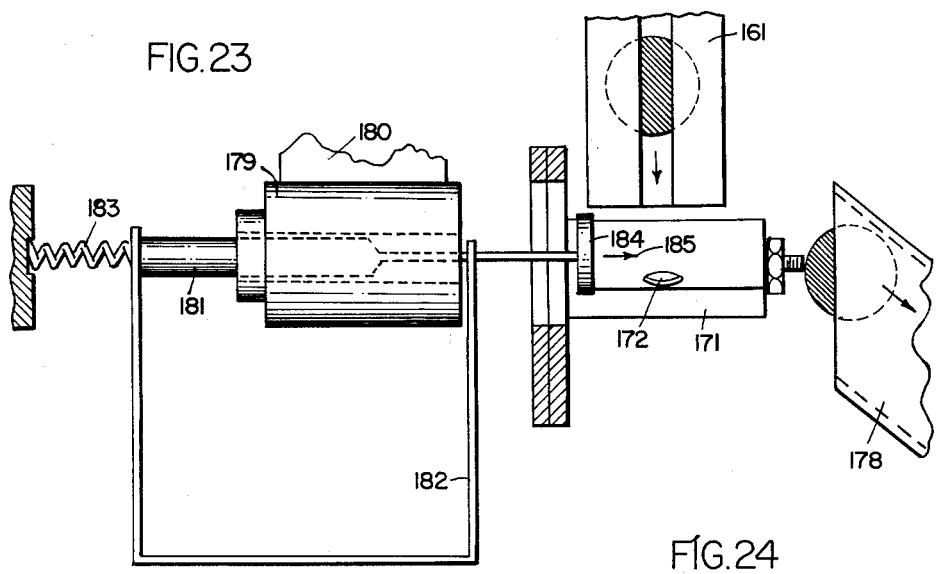

In FIGURE 22, I have illustrated in detail the manner in which the coins deposited in the bin 120 and on the disc 123 are directed through the passage 129 one at a time. A segment-shaped block 140 lies at the periphery of the bin 120 and is shown in elevation in FIGURE 24. The block 140 includes a finger-shaped director 141 which extends between the discs 123 and 128 and serves both as a guide to direct coin into the passage 129 and defines one side of the passage. The width of the passage 129 whose other side is formed by the vertical cylindrical wall 121 of the bin is slightly greater than the diameter of the coins to be proved. As the disc 123 rotates and throws the coins to the outside of the disc, they are urged in the direction of the passage 129 which because of its size receives them one coin at a time.

The angular velocity of the disc 128 which is great as compared to the disc 123 prevents two coins stacked one above the other from entering the passage together. The upper of the two coins in the stack will contact the disc 128 rotating at a much greater velocity than the lower disc 123 which carries the lower coin and the relative speed of the two discs will separate the two coins. The upper of the coins will be accelerated past the entrance of the passage 129 and make at least one more turn on the disc 123 before it enters the passage.

Mounted in a cavity 141 in the block 140 are a pair of pulleys 142 and 143 shown in broken lines in FIGURE 22 and in full lines in FIGURE 20. The bottoms of the pulleys are approximately coincident with or in the plane of the top of the passage 129. The pulleys 142 and 143 along with two additional pairs of pulleys 144, 145 and 146, 147 define a course for a pair of belts 148 and 149 shown in FIGURES 18, 20 and 22. The pulleys 146 and 147 furnish the drive for the belts 148 and 149 while the other pairs of pulleys idle on their respective shafts.

Figure 18:
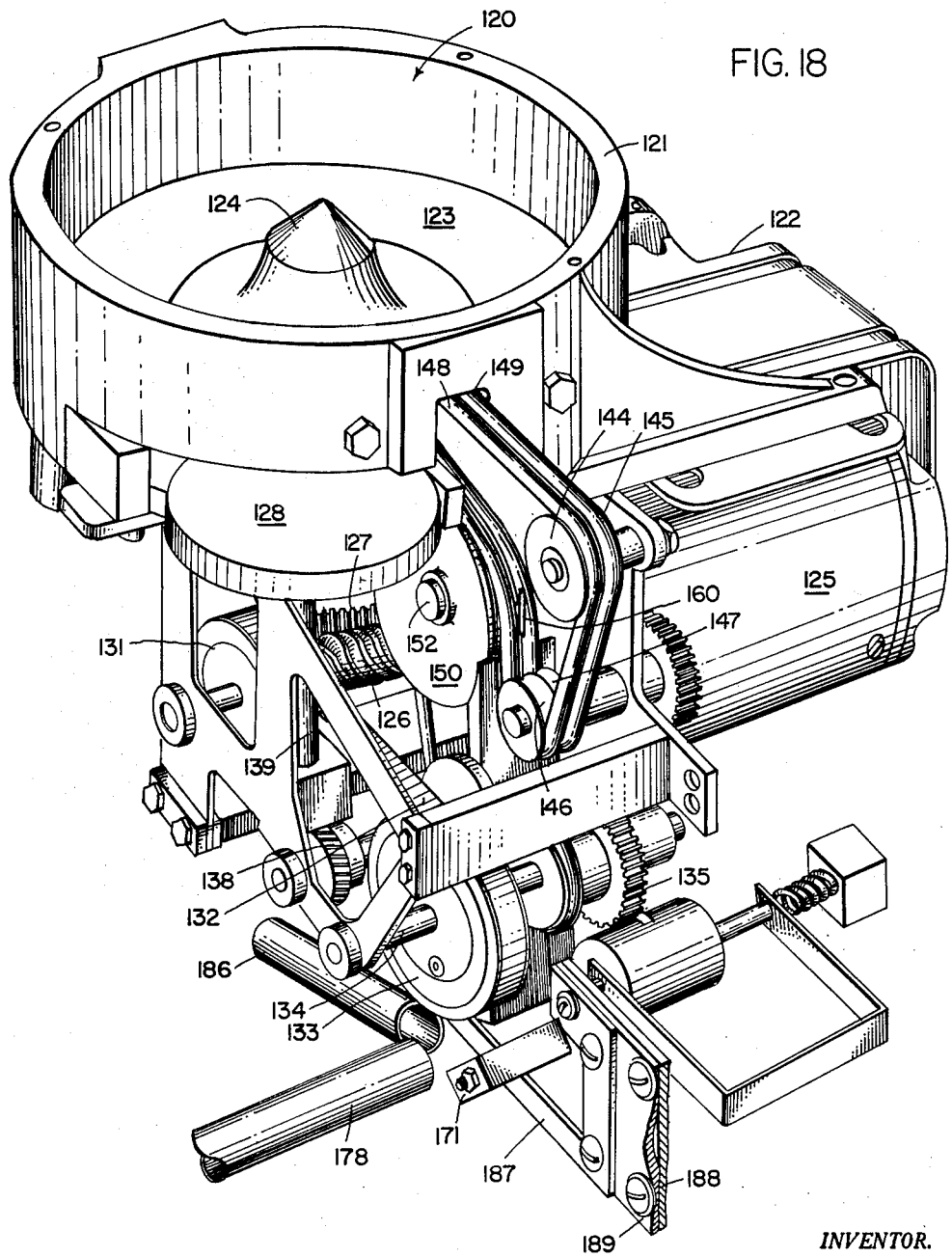
FIGURE 18 is a prospective view of the mechanical portion of the coin prover subassembly used in the embodiments of my invention shown in FIGURES 1 and 2.

In FIGURES 18 and 20, it will be noted that the courses of the belts 148 and 149 are partly defined by larger pulleys 150 and 151 which form part of a set of three pulleys which idle on a common shaft 152. The pulleys 150 and 151 are driven by the belts 148 and 149, respectively, while the third pulley (not shown) disposed between and somewhat smaller than the pulleys 150 and 151 provides a support for a belt 153 (see FIGURE 22) which travels at approximately four times the speed of the belts 148 and 149. It will be noted in FIGURES 20 and 22 that the belt 153 lies below the surface of the pulleys 150 and 151 for reasons which will be explained later.

Referring to FIGURE 20, the reader will note that the pulley 142 (as well as the pulley 143 not shown in that figure) has an irregular belt supporting surface composed of three flat areas 154, 155 and 156 which lie at different radii from the axis of rotation of the pulley. These flats vary the distance between the lower outer surfaces of the belts 148 and 149 and the upper surface of the disc 123 at the end of the passage 129. In FIGURE 20, it will be observed that a coin 157 which reaches the end of the passage 129 will be grasped by the belts 148 and 149 and held between them and the outer surfaces of the pulleys 150 and 151. The varying radii of the flats 154, 155 and 156 cause the belts to move toward and away from the upper surface of the disc 123 so that coins of different thickness will be engaged by the belts and carried to the pulleys 150 and 151 in the manner described. Because the only criteria for coins reaching this stage in the coin handling apparatus has been diameter, as provided by the sorter, it is possible that slugs thicker or thinner than the authentic coins of the particular denomination being tested have reached this stage. To insure that all coins will be picked up by the two belts 148 and 149 at the end of the passage 129, it is necessary to provide this flapping action of the belts relative to the disc 123. In the absence of such an arrangement, thin coins would pass to the very edge of the disc 123 at the end of the passage 129 and remain there, blocking the mechanism.

When the coins are carried between the two belts 148 and 149 and the outer edges of the pulleys 150 and 151, they travel in the direction of the arrow 158 in FIGURE 20. When the coins reach a position wherein they lie in a vertical plane, that is, at the location designated 159, a finger 160 shown in FIGURE 18 directs the coin into a chute 161 (see FIGURE 20). At this point, the belt 153 traveling at a much greater speed than the belts 148 and 149 accelerates the coin down the chute as suggested in FIGURE 18. The belt 152 whose full course is completed by the pulley 162 and which runs through the chute 161, frictionally engages the coin as suggested by coin 163 and carries it at a considerable speed to the point between the driven pulley 162 and a wheel 164 having a rubber rim 165. The wheel 164 turns at the same speed as the pulley 162 and thus, the belt 153 and the rubber rim 165 firmly grab the coin, center it within the chute 161, and throw it at great speed down and out the bottom of the chute 161.

I have stated above that the pulleys 146 and 147 provide the drive for the belts 148 and 149. Those pulleys are driven by the motor 125 through the pulleys 131 and 133 interconnected by the belt 132, the shaft 134, a gear 166 at the end of the shaft, an idler gear 167 operatively connected to the gear 166, a gear 168 which also engages the idler 167, and is mounted on shaft 169, which in turn carries the pulleys 146 and 147. The pulley 162 drives the belt 153 and is furnished power from the shaft 134 through the gears 135 and 136, to the shaft 137 which carries the pulley 162. The wheel 164 mounted directly on the shaft 134 is driven at the same speed as the pulley 162. Identical speeds are imparted to the pulley 162 and the wheel 164 because the gears 135 and 136 which provide the drive connection between the shafts 134 and 137 are identical.

I have described the manner in which the discs 123 and 128 serve to separate coins disposed one above the other by accelerating the upper of the coins which engages the disc 128 rotating at the greater speed. The belt 153 and the belts 148 and 149 cooperate in the same manner to separate coins which may overlap one another on the periphery of the pulleys 150 and 151. It will be appreciated from an inspection of FIGURE 20 that when the belts 148 and 149 initially engage a coin, its trailing edge may lift off the supporting surface of the disc 123 and the next coin in the passage 129 may move under it. When this occurs, two coins may overlap one another on the periphery of the pulleys 150 and 151 under the belts 148 and 149. When the overlapping coins reach location 159, the leading coin (the lead is less than the coin diameter) will be freed from the pulleys 150 and 151 before the other coin and be engaged by the belt 153. The belt 153 which travels at a much greater speed than the belts 150 and 151 will accelerate that coin with respect to the trailing coin, causing the leading coin to separate from it and lead the other coin down the chute 161. The necessity for separating the coins as they travel down the chute 161 will become apparent below.

In FIGURES 19a–19d, I have illustrated the successive positions of a coin as it leaves the bottom of the chute 161 and strikes an anvil 171. I stated above that the coins are proved by causing them to ring at their fundamental or natural resonant frequency in a half wave circular mode. To obtain this type of ring, the coin must strike the anvil 171 sideways on an edge of the rim and ring suspended in free air. This is accomplished by a flexible insert 172 made of rubber, nylon or some other similar material embedded in the anvil. Referring to the series of illustrations in FIGURES 19a–19d, it will be noted that the coin 173 leaving the chute 161 first hits the insert 172 vertically and then flips in the direction of arrow 174. This flipping action of the coin 173 causes only the edge 175 of the rim of the coin 173 to strike the hardened steel anvil 171 (see FIGURE 19c) and thereafter leave the anvil as shown in the last of the series of illustrations, spinning in the direction of arrow 176. Thus, the vibration or ring of the coin takes place while the coin is suspended in free air. Obviously the same effect may be achieved in other ways without the soft insert 172. Nevertheless, the arrangement described has proved satisfactory.

When the coin moves from the position shown in FIGURE 19c to that of FIGURE 19d, it will for a moment lie in a position wherein its face is parallel to the face of the microphone 177. Thus, the microphone 177 can pick up the maximum intensity of the sound vibration of the coin. It may be noted at this time that the natural resonant frequency of coins is so high that it can clearly be distinguished from the ambient noise level of any surrounding machinery. The signal picked up by the microphone 177 through an electrical network described in detail in the next section of this specification, operates a trigger mechanism illustrated in FIGURE 23. This trigger mechanism serves to direct authentic coins, that is, those coins whose ring falls within a predetermined frequency range, into a chute 178.

The trigger mechanism includes a solenoid coil 179 carried on a support 180 and surrounds a solenoid plunger 181 supported by a flexible frame 182 made of leaf springs. A coil spring 183 serves to yieldably retain the plunger 181 in the normal position illustrated in FIGURE 23. Excitation of the solenoid coil 179 causes the plunger 181 to move to the right as viewed in the drawing and carry the trigger plate 184 in the direction of arrow 185. This action of the plate 184 is timed with the bounce of the coin off the anvil 171 so that it hits the coin and directs it into the chute 178 as suggested in the drawing. The leaf spring support 182 of the plunger 181 insures proper alignment of the plunger 181 with the coil 179 and confines its motion to an axial path. If the ring fails to energize the solenoid coil in the case of other than an authentic coin, the coin will bounce from the anvil directly into the chute 186 for rejected coins shown in FIGURES 18 and 20.

It will be noted in FIGURE 18 that the anvil 171 is carried on a frame 187 isolated from the arm 188 of the main frame 122 by a pad 189 made of some sound absorbing material. This pad serves to prevent the metallic frame from carrying sound waves to the anvil and microphone. Although the support for the microphone 177 is not illustrated, it is to be understood that it also is supported on the frame 187 and isolated from the remaining structure by the pad 189.

From the foregoing description it will be appreciated that the proving subassembly establishes the authenticity of coins introduced into the bin 120 by directing them one at a time against the anvil 171. Striking the anvil, the coins ring at their natural resonant frequency and if the rings lie within a preselected band width, they are accepted as authentic.

*Electronic Control Circuit for Coin Proving Subassembly (FIGS. 26–28)*

The circuit which controls the operation of the solenoid coil 179 which in turn directs acceptable or authentic coins from the anvil 171 into the chute 178 is shown in FIGURE 26. This same circuit also is used to operate the recording mechanism shown in plan in FIGURE 29. This counter is mounted on the walls of the trailer 1 and van 3 in FIGURES 1 and 2 and identified by numerals 190.

In the circuit, the microphone 177 disposed adjacent the anvil 171 and illustrated clearly in FIGURE 20 provides the input voltage for a conventional three stage band pass amplifier 191 in which the filters 192 and 193 form the frequency selective circuit. The signal voltage at the plate 194 of the amplifier tube of the third stage 193 of the amplifier 191 is shown in FIGURE 27. The sign wave shown in that figure is produced when the microphone 177 senses the ring of an authentic coin of the denomination tested by the prover. Coins of other denominations are proved by separate provers adjusted for the frequency at which they resonate in free air.

The circuit 195 connected to the output stage of the amplifier 191 is a half wave rectifier and integrator and converts the pulse of FIGURE 27 to a pluse at the grid 196 of the tube 197 to the form shown in FIGURE 28. A Schmidtt trigger circuit is connected to the output of the integrator circuit 195. Briefly, the Schmidtt circuit includes tubes 197 and 198. In the normal condition tube 197 is conductive and tube 198 is non-conductive by virtue of the voltage drop across the resistor 199. When a negative pulse is applied to the grid 196 of tube 197, the grid 200 of tube 198 is driven positive and causes the tube 198 to conduct and increase the voltage drop across resistor 201. This action causes a flip which drives tube 197 to a nonconductive state. After approximately 20 milliseconds capacitor 202 charges through resistors 203 and 204 reducing the grid voltage on tube 198 and producing the condition which causes the circuit to return to its original state. Thus, relay 205 is picked up for 20 milliseconds in response to the ring of an authentic coin sensed by the microphone 177. The coil 206 of relay 205 closes switch 207 to complete the circuit to the solenoid 208 which controls the plunger and kicks the coins into the chute 178 for authentic coins. Obviously the solenoid 208 may either be the same as that which controls the pusher 184 or may serve to control a second solenoid which performs that function.

Figure 29:
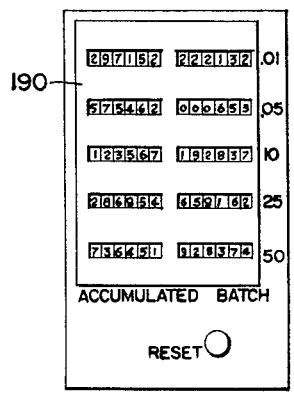
FIGURE 29 is an elevation view of the counter panel suggested in FIGURE 1.

The closing of switch 207 also operates the electric impulse counters 209 to record the coin count on the register 190 of FIGURE 29. A transformer 210 and a bridge rectifier 211 provide the power for the circuit which includes the solenoid 208 and the counter 209. The power supply for the amplifier 191, integrator 195 and Schmidtt circuit is supplied by the transformer 210 and the bridge rectifier 212.

It should be understood that if the microphone 2 senses a ring of a counterfeit coin which does not lie within the designated frequency band of acceptable coins as established by the filters 192 and 193, no signal will appear at the plate 194 of the tube at the output of the amplifier and no action will occur in terms of counting or kicking the coins into the authentic coin chute 178.

*Bin Discharge Mechanism (FIGURES 30–34)*

At the bottom of each of the bins 19–24 in the mobile unit shown in FIGURE 1 and in the bottom of each bin 32 in the unit of FIGURE 2, valve mechanisms are provided to empty their contents when desired. It is of course important that these valve mechanisms be tamper proof and of sturdy construction to prevent pilfering and unwanted discharge of the coins. The several bins in the mobile units each receive the coins proved by one of the coin proving mechanisms described in detail in the two preceding sections. One bin in each unit (22 in FIGURE 1) receives the rejects or counterfeits from all of the provers through the chutes 186. It may also be noted at this time that the chutes 25–29 in FIGURE 1 convey authentic coins from the provers to the several bins and are identical to the chute 178 in FIGURE 23.

Figure 30:
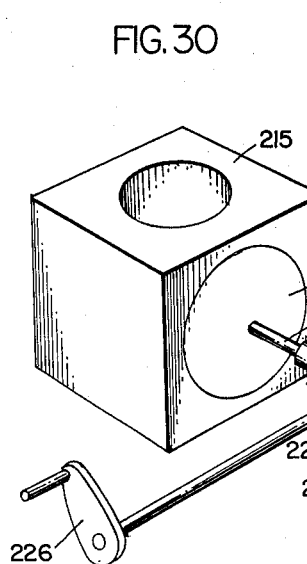
FIGURE 30 is a fragmentary prospective view of the discharge control mechanism located at the bottom of the coin bins in the machines of FIGURES 1 and 2.
Figure 31:
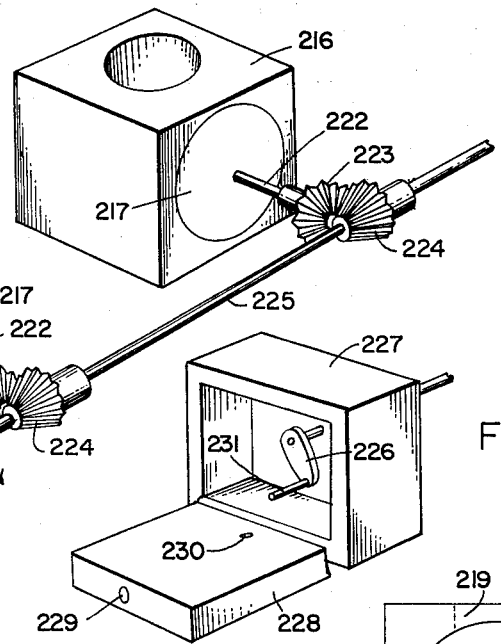
FIGURE 31 is a fragmentary view of the handle and safety mechanism used with the discharge control device of FIGURE 30.
Figure 33:
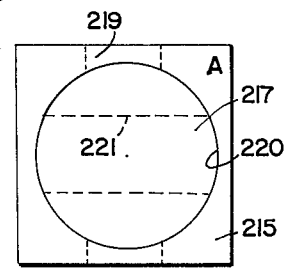
FIGURES 33 and 34 are elevation views of faces A and B, respectively, of the valve shown in FIGURE 32.
Figure 32:
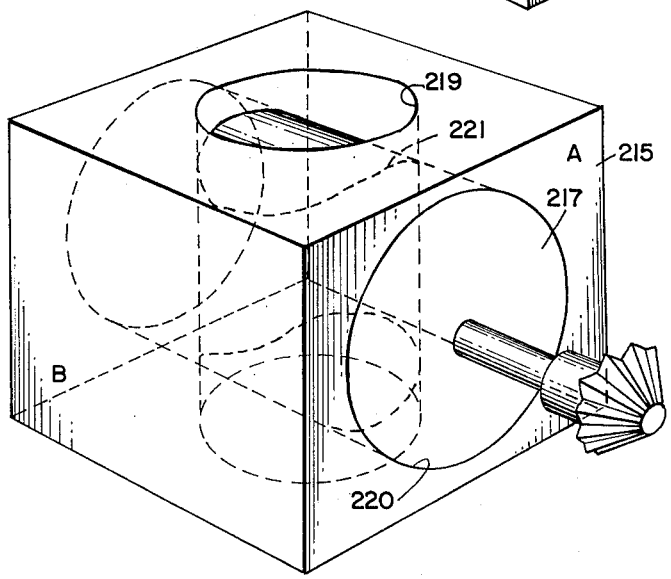
FIGURE 32 is a prospective view of one of the valves in the mechanism of FIGURE 30.
Figure 34:
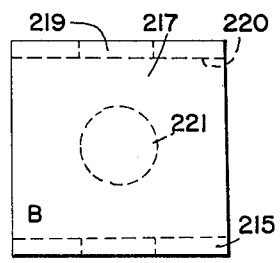

In FIGURE 30 two valve housings 215 and 216 are shown and each contains a rotating cylinder 217 controlled by a gear and crank assembly 218. The two valves shown are identical and in the trailer 1 of FIGURE 1 four additional valves would be required to control the coin discharge from the six bins 19–24 present. The additional valves would also be operated by the gear and crank assembly 218. In FIGURES 32–34 one valve is shown in detail.

A vertically disposed cylindrical bore 219 extends completely through the housing 215, and the cylinder 217 extends through a second cylindrical bore 220 which intersects the bore 219. An opening 221 passes radially through the cylinder 217 and is adapted to be moved in and out of alignment with the vertical bore 219 by rotation of the cylinder. In FIGURE 32, the passage 221 is shown aligned with the bore 219 to open the valve. In FIGURES 33 and 34 faces A and B of the valve are shown in elevation and the cylinder 217 is displaced 90° from the position shown in FIGURE 32. The passage 221 is out of alignment with the bore 219 and in this latter position the valve is closed for the cylinder 217 blocks the bore through the housing 215 and prevents the passage of coins through it.

In FIGURE 30, the cylinders 217 are shown controlled by a single gear and crank assembly 218. However, it is to be understood that each of the valves disposed at the bottom of the several bins may be controlled by separate mechanisms so that each may be operated independently of the others.

The gear and crank assembly 218 includes shafts 222 connected axially one with each cylinder 217 and each carries a beveled gear 223 at its free end. The beveled gears 223 mesh with similar beveled gear 224 mounted on the crank shaft 225. A crank handle 226 mounted on the end of the shaft 225 is provided to facilitate the operation of the crank shaft and turn the cylinders 217.

The crank handle 226 may be disposed in a housing 227 preferably secured to the outside of the trailer compartment which houses all of the coin handling equipment. The crank shaft 225 extends through the wall of the trailer in a horizontal plane adjacent the bottoms of the several bins aligned on the compartment floor. The housing 227 secured to the outside of the trailer has a door 228 which may be closed with a security lock as suggested at 229. Thus, when it is desired to open the valves to empty the bins, it is necessary to unlock the door 228 of the housing 227 to reach the handle 226. A recess 230 may be provided on the inner surface of the door 228 to receive the end 231 of the handle and prevent it from turning in response to the normal vibrations which will occur when the mobile units are moved on the highway.

In practice, receiving stations for the coin may be provided with coin handling equipment in the floor. The trailer or van will be moved to a position above this equipment and only then will the contents of the bins be discharged. Such an arrangement is suggested in FIGURE 3. In that figure, the truck which forms the mobile unit has a van containing all of the coin testing equipment. Only the bins and valves at the bottom of the truck are suggested in the drawing, and these only diagrammatically. The bins 240 which receive the coins from the provers are controlled by valves 241.

Formed in the floor 242 of the receiving station is an opening 243 which slidably receives the upper section 244 of a telescoping chute 245. When the truck or a trailer of the type shown in FIGURE 1 is placed in a position above the floor 242 so that one of the discharge valves 241 is vertically aligned with the chute 245, the upper section of the chute 244 may be raised hydraulically, mechanically or manually to engage the bottom of the van and surround the valve to provide a closed conduit between the bin 240 and the hopper 246 on the floor below. The valve may then be opened to empty the contents of the bin into the hopper. The hopper in turn may feed the coins to a conveyor 247 which carries them to either automatic coin packaging machines (not shown) or to any other equipment or location.

Figure 3:
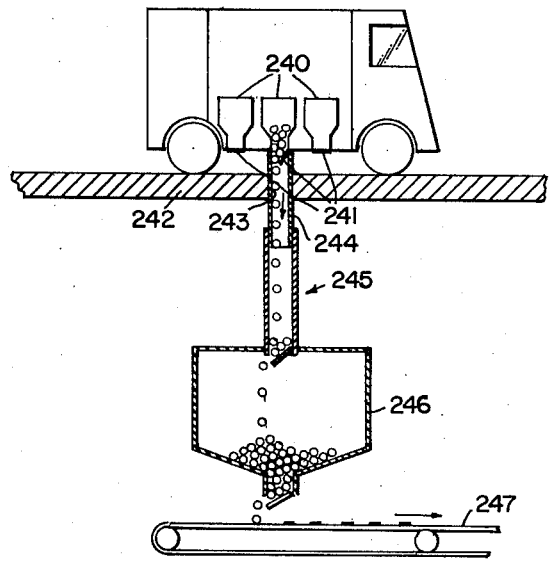
FIGURE 3 is an elevation view of the machine shown in FIGURE 2 and illustrates how coins may be withdrawn from it.

It should be understood that if only one such coin receiving mechanism as shown in FIGURE 3 is provided, then separate valve actuators will be required for each bin discharge valve in the van. Alternatively, several such mechanisms may be provided and the contents of each bin in the van may be emptied simultaneously and controlled by a single valve actuator serving all valves.

*Subassembly for Detecting Physical Abnormalities in Coins (FIGURES 35–41)*

This subassembly which normally is disposed in the system after the coin providing mechanism, detects physical abnormalities in coins and separates coins having such abnormalities from coins in good condition. As coins subjected to its tests have passed through the prover, when used in the system it will only receive authentic coins. Thus, if the coins are found to have no physical defects, it must necessarily follow that they are suitable to be reintroduced into circulation.

This subassembly may be mounted either in the mobile unit or permanently installed at a fixed location. This will be described more fully in connection with the operation of the coin handling system.

In FIGURE 35, the detecting device is shown organized about a support 250 over which a belt 251 travels. The upper horizontal run 252 of the belt passes beneath a testing mechanism 253 which inspects the thickness and diameter of the coins carried on the belt.

The belt 251 is provided with longitudinally aligned circular cavities 254 which are adapted to carry coins to be tested over the support 250 and beneath the mechanism 253. The coins are deposited one at a time in the cavities 254 by the pick-up mechanism shown in FIGURE 36. The pick-up mechanism includes a cylinder 255 disposed above the upper run 252 of the belt and houses a stack of coins 256 to be tested. As the belt travels beneath the cylinder 255 each recess 254 picks up one coin and carries it to the test position beneath the assembly 253. Thus, a coin disposed in the recess 254a in FIGURE 35 would be subjected to the tests.

The bottom edge 257 of the cylinder 255 is spaced from the top surface of the belt less than the thickness of a coin. Therefore, only when a cavity 254 is aligned with the cylinder will a coin leave it and be carried to the testing device 253.

The belt 251 is substantially thinner than the coins to be carried by it so that they extend a substantial distance above its surface. As will become apparent below, this is necessary to afford the testing device 253 the opportunity to make all of the necessary inspections of the coin.

In FIGURES 37 and 38, a portion of the test mechanism 253 is shown which inspects the diameter of the coins to determine if the diameter is within allowable limits. This mechanism includes a finger 258 having a curved tip 259 which is adapted to bear against the side of the coin carried to the position of cavity 254a in FIGURE 35. The finger 258 is pivotally mounted on a support 260 and as shown in FIGURE 38 is loaded by a spring 261 which urges the tip 259 against the coin 262 to be tested. As stated above, the belt 251 is thinner than the coin and, therefore, the edge of the coin does extend above the belt surface. Thus, the finger 258 is free to swing over the surface of the belt and engage the edge of the coin which extends out of the cavity 254. Of course, the spring loaded finger urges the coin against the side 263 of the cavity opposite the finger so that the reference position is established by that side for each coin.

The end 264 of the finger 258 acts as a switch blade and carries a movable contact 265 between a pair of fixed contacts 266 and 267. If the coin 262 being tested has an acceptable diameter, the contact 265 will remain in the position illustrated in FIGURES 37 and 38 between and not engaging either of the fixed contacts 266 and 267. However, if the coin diameter is larger than normal, the contact 265 will pivot with the finger 258 and engage the contact 267 to complete the circuit between leads 268 and 269 connected respectively to the contact 267 and the pivotal support 260 in electrical communication with the finger. It is understood that the finger 258 is made of electrically conductive material. On the other hand, if the diameter of the coin being tested is below an acceptable limit, the contact 265 will engage the contact 266 and close the circuit between the lead 269 and a lead 270 secured to the fixed contact 266.

A similar arrangement is provided to test the thickness of the coins. In FIGURE 39, a series of eight fingers 271 are carried on a common pivotal support 272 and each is provided with a tip 273 adapted to bear against the surface of the coin carried beneath them. Although the fingers 273 are illustrated diagrammatically in line form in FIGURE 35, it is to be understood that they have appreciable thickness as shown in FIGURE 39 so that the series of tips 273 substantially cover the full diameter of the coin. Each of the fingers 271 operates independently of the others and in the same manner as the finger 258 which inspects or measures the diameter of the coin. Referring to FIGURE 40, the reader will note that the finger 271 illustrated is spring loaded by the coil spring 274 and its tip 273 bears against the surface of the coin. The other end 275 of the finger 271 forms a switch blade and carries a contact 276 which is adapted to move between the two fixed contact bars 277 and 278. When an unworn and unmutilated coin passes beneath the tip 273 of the finger, the contact 276 remains in the position illustrated in FIGURE 40 spaced between the two fixed contact bars. A coin thinner than what is acceptable will cause the contact 276 to engage the bar 277 while a thicker than average coin will cause the finger 271 to pivot around its support 272 and move the contact 276 into engagement with the fixed contact bar 278.

Any one of the fingers 271 is adapted to complete the circuit between the lead 279 connected to the pivotal support 272 and either lead 280 or 281 connected to the upper and lower fixed contact bar 277 and 278, respectively. Thus, if but one portion of the coin is thicker than normal, the finger which senses the abnormality and raises against the bias of its spring 274 as it slides over the thicker portion of the coin will cause its contact 276 to engage the contact bar 278 and complete the circuit between the leads 279 and 281. Similarly, should one of the fingers 271 and more particularly its tip 273 sense a depression or hole in the coin, its contact 276 will engage the bar 277 and complete the circuit between the leads 279 and 280.

Referring again to FIGURE 35, the reader will note that a plate 285 rests in a depression 286 formed in the upper surface of the support 250 and is provided with an opening 287 adjacent one end substantially the same size as the cavities 254 in the belt 251. The upper surface of the plate 285 is coplanar with the surface of the support 250 and thus does not interfere with the travel of the belt along its run. The plate 285 is adapted to move transversely of the run 252 of the belt in the depression 286 and is controlled by a solenoid 288 having a plunger 289 secured directly to the plate. When the solenoid 288 is energized, it retracts its plunger 289 and draws the plate 285 toward the coil so that the cavity 287 lies beneath and in alignment with the cavity 254a bearing the coin being tested. When this occurs, the coin in cavity 254a drops into the opening 287 and upon deenergization of the solenoid the plunger returns the plate 285 to the position illustrated and the coin is carried to and discharged into the reject chute 290. When the solenoid 288 fails to energize, the coin after being tested is carried with the belt 251 along its run 252 and ultimately deposited at a point of collection.

Figure 41:
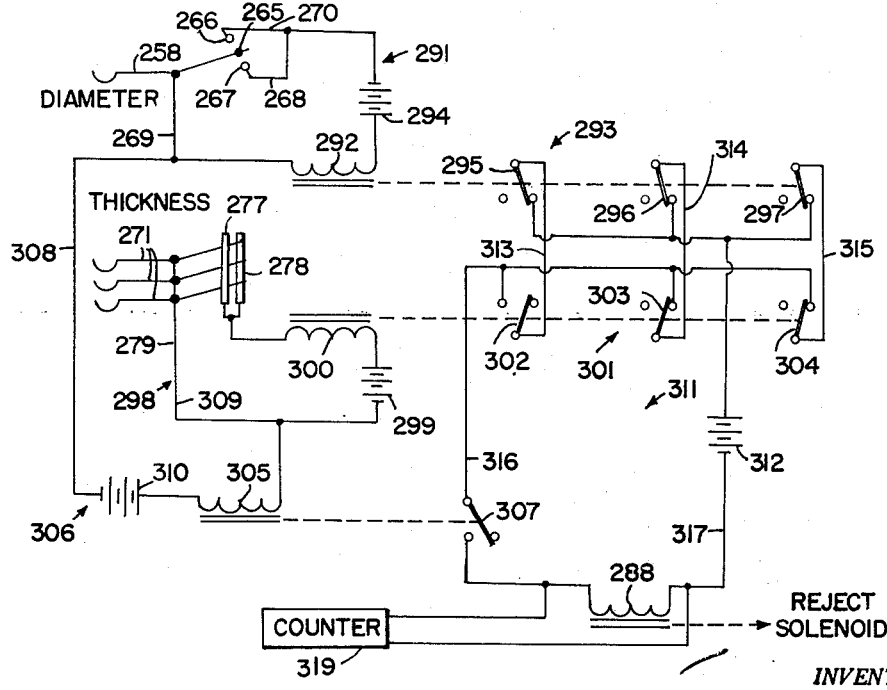
FIGURE 41 is a schematic diagram of the circuit employed with the mechanism of FIGURES 35–40.

The electrical circuit controlling the solenoid is illustrated in FIGURE 41. It will be noted in that figure that the fingers 258 which tests or measures the diameters of the coins being inspected controls a circuit 291 which includes the coil 292 of relay 293 and a power supply 294. When the contact 265 engages either of the fixed contacts 266 and 267, the coil 292 of the relay is energized and moves the blades 295, 296 and 297 from the position illustrated to the alternative position wherein they engage the other set of contacts.

The fingers 271 control a second circuit 298 similar to the circuit 291. The circuit 298 includes a power source 299 and the coil 300 of a relay 301. Thus, when the contacts 276 of any of the fingers 271 engage either of the two fixed contact bars 277 and 278, the coil 300 energizes and throws the switches 302, 303 and 304 from their illustrated position to the alternate position.

A coil 305 forms part of a third circuit 306 which responds to the presence of a coin in the cavity 254a of the belt, that is, in a position to be inspected by the testing mechanism 253, regardless of the diameter or thickness of the coin. When a coin is engaged simultaneously by the fingers 258 and one of the fingers 271, the coil 305 becomes energized and closes the switch 307. The coin forms a conductive path between the fingers 258 and at least one of the fingers 271 and completes the circuit 306 through leads 269, 308, and 309 and the power source source 310. The switch 307 forms part of a fourth circuit 311 which contains the solenoid 288 which operates the ejector plate 285.

The circuit 311 contains a power source 312 and is closed in response to energization of either of the coils 292 and 300 of relays 293 and 301, respectively, assuming of course that switch 307 is closed. It will be noted that switches 295 and 302 are connected by lead 313, switches 296 and 303 by lead 314, and switches 297 and 304 by lead 315. Each of these leads with their switches is adapted to complete the circuit 311 to energize the solenoid 288 under certain conditions, as follows: Assume that the finger 258 senses a coin of abnormal diameter and energizes the coil 292 of relay 293. When the bank of switches 295, 296 and 297 are thrown to the left as viewed in FIGURE 41 in response to energization of the coil 292, the circuit 311 will be energized through switches 296 and 303 and lead 314 electrically connecting leads 316 and 317. If one of the fingers 271 senses an abnormal thickness, the coil 300 will become energized and draw the bank of switches 302, 303 and 304 to the left. In this case, assuming that no abnormality is sensed by the finger 258, the switches 302 and 295 and the lead 313 will complete the circuit 311 and energize the solenoid 288. If the finger 258 and one of the fingers 271 sense an abnormal condition, all of the switches of relays 293 and 301 will be thrown, and the switches 297 and 304 and the lead 315 will complete the circuit 311 and energize the solenoid. Thus, it is seen that any one of the fingers which senses an abnormal condition will cause the plate 285 to retract and allow that coin to drop into the opening 287. When the coin tested drops into the opening 287, the continuity of the circuit 306 which contains the coil 305 is broken. Thus, the coil 305 deenergizes and the switch 307 opens, deenergizing the circuit 311 and its solenoid 288. The solenoid then releases its plunger 289 and the spring 318 returns the plate to the position shown in FIGURE 35. When this occurs, the coin is discharged into the chute 290. The number of coins rejected may be recorded by the counter 319 connected across the solenoid 288. This counter of course may take any conventional form and moves one unit each time the solenoid 288 is energized.

*Operation*

In the foregoing description, I have described in detail each of the subassemblies in my coin handling machine under appropriate subtitles. Although the operation of each subassembly has not been specifically described, it is believed clear from their description how each operates. Therefore, it is deemed unnecessary now to refer to each of the components of the several subassemblies in describing the operation of the equipment as a whole.

The following description of the coin handling assembly will be presented in terms of the use of the vehicle shown in FIGURE 2 particularly adapted to collect coins from parking meters. The vehicle which may be operated most efficiently by two men, that is, a driver and an equipment operator, will be parked adjacent each meter from which coins are to be extracted. When the vehicle has parked, the operator will connect the head 41 on the free end of the flexible hose 40 to the parking meter. When the head 41 is connected to the meter in the manner suggested in FIGURE 4, the coins in the meter will be conveyed by the air drawn through the hose by the impeller 43 and flow to the sorter 30 disposed in the van 3 of the vehicle. The hose 40 of course should be long enough to allow the vehicle to park in a double line when necessary and still be capable of reaching the meter at the curb.

The pennies, nickels and dimes extracted from the parking meter and fed to the sorter 30 will be separated according to size by the several concentric drums which form the sorting subassembly. The coins which approximate the size of nickels will be directed from the sorter to a particular prover for determining the authenticity of nickels while separate provers will receive the coins which approximate the size of pennies and dimes and determine their authenticity.

Discharge chutes interconnect the several sections of the sorter with the bins 120 of different provers and should be so constructed that motion of the vehicle will not disturb the flow of the coins from the sorter to the several provers. The prover illustrated in detail in FIGURES 18–28 is one of three such provers mounted in the van 3 of the vehicle shown in FIGURE 2. The rather complex feed mechanism directs the coins one at a time to the anvil 171 which causes each coin to ring at its natural resonant frequency in free air. The microphone 177 senses the ring of each coin and converts it into an electrical signal. The electronic circuit shown in FIGURE 26 determines whether the signal lies within a frequency band width determined by the natural resonant frequency of coins known to be authentic. If the frequency of the ring lies within the predetermined band width, the kicker 184 operated by the solenoid 179 directs the coin into the chute which interconnects the particular prover with the bin at the bottom of the van which collects authentic coins of the particular denomination tested by the prover. In the absence of a signal within the predetermined band width, the coins are allowed to bounce off the anvil into the chute which communicates with the reject bin at the bottom of the van.

It is unnecessary for the vehicle to remain stationary while the various sorting and proving operations are conducted. Just as soon as all of the coins are removed from the meter, the operator may remove the head from the meter, board the vehicle, and the driver may proceed to the next parking meter. While the vehicle moves from one meter to the next, the equipment in the van may conduct its specific operations on the coins collected. The counting mechanism which forms part of the prover circuit will tabulate the total number of coins of each denomination collected during the day or for some other period and may also record the number of coins of each denomination extracted from each parking meter. It will be noted that the recording panel 190 illustrated in FIGURE 29 contains two columns, one which records the accumulated collections of coins of each denomination and a second column which records the number of coins collected in each batch. A reset button is provided to clear the batch column.

After the vehicle has made its rounds and collected all of the coins from parking meters in a designated area, it will return to the receiving station to discharge the collected coins. The receiving station may include a discharge assembly of the type shown in FIGURE 3. When the vehicle is appropriately positioned over one or more chutes 245 the valves which control the discharge of the coins in each of the bins disposed at the bottom of the van will be opened. The coins will drop into the hopper 246 and may be conveyed to any type of equipment by the conveyor 247. This equipment may be of the type which automatically packages coin or may be of the type shown in FIGURES 35–41 for separating mutilated coins from those which are in good condition. This equipment may be preset to allow for certain tolerable differences in diameter and thickness from coin to coin. The equipment is preset for the allowable tolerances by adjusting the separation between the fixed contacts 266 and 267, and 277 and 278. These several fixed contacts of course determine the degree of freedom allowed the various contract fingers before the ejector plate 285 is actuated by the solenoid 288.

The foregoing description has been limited to the operation of my invention in one specific application. It should be understood that other applications may require only a limited number of the various subassemblies described. Two such applications are suggested in the box diagrams in FIGURES 42 and 43.

Figure 42:
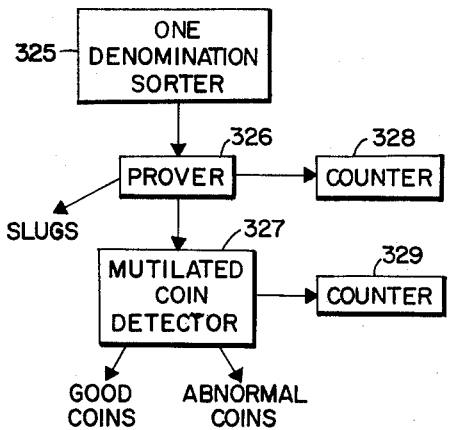
FIGURES 42 and 43 are block diagrams illustrating the manner in which various subassemblies may be used in combination for different applications.

The arrangement suggested in FIGURE 42 is particularly designed to handle coins of one denomination. Such an arrangement may be used to advantage in a bank or other similar institution and may be duplicated several times by assemblies for handling coins of other denominations. Assume that the system is to be used in the handling of nickels. The sorter 325 may be composed of three concentric drums with the inner drum having holes therein which will not pass half dollars and quarters but which will pass nickels, pennies and dimes. The second drum will have openings formed in its wall which will retain nickels but allow pennies and dimes to pass to the outer drum. The nickels separated from the other coins will be conveyed to the prover 326 which will reject counterfeits or slugs and pass the authentic coins to the subassembly 327. The prover may record the number of authentic coins tested at the counter 328. The subassembly 327 will separate mutilated authentic coins from those in good condition and record the number of good coins at the counter 329.

Figure 43:
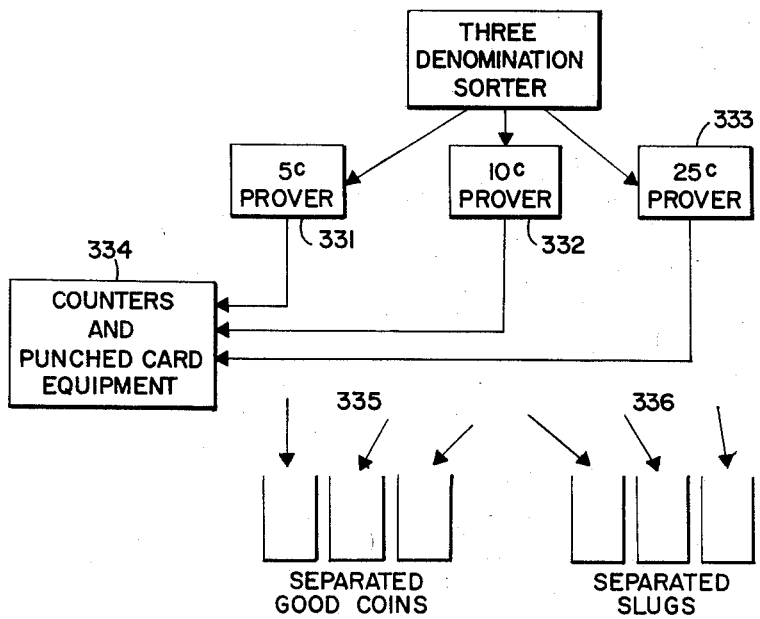

The assembly shown in FIGURE 43 is particularly suited for use by telephone companies. The assembly may be installed either in a mobile unit or in a central counting office. In this assembly, the sorter 330 will direct coins which are ostensibly nickels, dimes and quarters to the three separate provers 331, 332 and 333.

As it is necessary to record the amount of money received from each pay station so as to credit the owner of the premises with his share of the gross receipts of the particular pay station. The impulse counters 209 which form part of the electronic circuits of the several provers may be connected to data processing equipment represented by box 334 which records the value of authentic coins tested by the provers on punch cards. The separated good coins from the three provers may be collected in the bins 335 while the separated slugs may be collected in a separate set of bins 336.

From the foregoing description, those skilled in the art will appreciate that numerous modifications may be made of the several subassemblies disclosed without departing from the spirit of my invention. Moreover, the subassemblies may be arranged in many different combinations which have not been specifically described in the foregoing description. Therefore, I do not intend to limit the breadth of my invention to the specific embodiments illustrated and described, but rather, it is my intention that the scope of my invention be determined by the appended claims and their equivalents.

What I claim as new and desire to secure by Letters Patent of the United States is:

1. In a coin handling machine disposed in a trailer and having coin receiving means and a sorter disposed in the trailer and operatively connected to the coin receiving means for separating coins according to size; a coin proving machine comprising an anvil against which coins are directed to cause them to ring at their natural resonant frequency, a feeding device including a straight coin chute terminating adjacent to and aimed at the anvil, a pulley disposed so that its periphery tangentially meets the inlet end of the chute, a belt engaging a portion of the periphery of the pulley and defining a run on the pulley periphery terminating at the inlet of the chute, means for driving the belt to rotate the pulley, means for directing coins under the belt and on the pulley periphery whereby coins are directed by the pulley and belt to the inlet of the chute, and means operatively associated with the pulley and moving faster than the pulley for accelerating coins as they leave the pulley periphery and enter the chute.

2. A machine as defined in claim 1 further characterized by a bin mounted in the trailer for receiving authentic coins, and means forming part of the prover and responsive to the ring of coins falling within a preselected frequency band width for kicking the coins into the bin after striking the anvil.

3. A machine as defined in claim 1 further characterized by said prover comprising a microphone disposed adjacent the anvil for converting the ring of a coin to an electrical signal having a frequency equal to the frequency of the ring, an electrical circuit connected to the microphone and adapted to pass said signal if it lies within a preselected frequency band width, a bin for authentic coins, and a kicker responsive to the circuit passing the signal for pushing the coin into the bin of authentic coins.

4. Means for separating a pair of overlapped coins moving along a path comprising a first pulley, a belt engaging the pulley over a circumferential run, means for driving the belt and pulley, means operatively associated with the belt causing the belt to pick up coins in the path and carry them on the periphery of the pulley over the run, a second pulley disposed adjacent the first pulley and being slightly smaller than the first pulley, said second pulley being rotatable coaxially with the first pulley, a second belt driven at a greater speed than the first recited belt and travelling a circumferential run on the second pulley and with its outer side lying immediately below the plane of the surface of the first pulley, said circumferential run of the second belt terminating beyond the end of the run of the first belt, and means directing the coins against the second belt as they are released from between the first pulley and its belt.

5. In combination with a coin handling machine disposed in a trailer and having coin receiving means and a sorter disposed in the trailer and operatively connected to the coin receiving means for separating coins according to size; a coin proving machine comprising an anvil against which coins are directed to cause them to ring at their natural resonant frequency, a feeding device including a coin chute terminating adjacent to and aimed at the anvil, a pair of moveable members in contact with one another over a prescribed course, said course terminating at the inlet end of the chute, means for driving the members while maintaining the contact between them over the prescribed course, means for directing coins between the members whereby the coins are carried by them to the inlet of the chute, and means operatively associated with the members for accelerating the coins as they leave the course between the members and enter the chute.

6. A coin proving machine comprising an anvil against which coins are directed to cause them to ring at their natural resonant frequency, a feeding device including a coin chute terminating adjacent to and aimed at the anvil, a pair of moveable members in contact with one another over a prescribed course, said course terminating at the inlet end of the chute, means for driving the members while maintaining the contact between them over the prescribed course, means for directing coins between the members whereby the coins are carried by them to the inlet of the chute, and means operatively associated with the members for accelerating the coins as they leave the course between the members and enter the chute.

7. In a coin proving machine having an anvil against which coins are to be directed to cause them to ring at their natural resonant frequency, a feeding device for so directing the coins comprising a straight coin chute terminating adjacent and aimed at the anvil, a pulley disposed so that its periphery tangentially meets the inlet end of the chute, a belt engaging a portion of the periphery of the pulley and defining a run on the pulley periphery terminating at the inlet of the chute, means for driving the belt to rotate the pulley, means for directing coins under the belt and on the pulley periphery whereby coins are directed by the pulley and belt to the inlet of the chute, and means operatively associated with the pulley and moving faster than the pulley for accelerating coins as they leave the pulley periphery and enter the chute.

8. In a coin proving machine having a passage through which coins to be proved are directed, apparatus for introducing coins into the passage comprising a pulley, a belt having a portion running over an arc of the pulley circumference and tangentially leaving the circumference at each end of the arc, a flat support under a portion of the belt adjacent one end of the arc, a second pulley engaging the belt over the support, said pulley holding the belt a distance above the support substantially equal to the thickness of a coin, means for oscillating the belt toward and away from the support, and means for driving the belt in a direction from the second pulley to the first pulley whereby coins on the support are engaged by the belt and drawn over the arc of the first pulley.

9. A coin proving machine comprising a horizontal plate, means for rotating the plate about a fixed vertical axis, a cylindrical wall surrounding the plate and forming with it a container for receiving a plurality of coins to be proved, a second horizontally disposed circular plate extending through an opening in the wall and overlying a portion of the first plate, said plates being spaced apart a distance slightly greater than the thickness of the denomination of the coin to be proved, means for rotating said second plate at a substantially greater speed than the first plate, a first pair of spaced pulleys rotatably mounted on a horizontal axis and with their upper edges lying in the plane of the upper surface of the first plate and immediately adjacent the first plate, a passage defined in part by said plates and terminating at the periphery of the first pair of pulleys, a pair of belts engaging a portion of the circumference of the first pair of pulleys and defining a run over them beginning at a point adjacent the end of the passage, additional pulleys supporting the belts for driving the belts and defining their course over the end of the passage whereby the belts engage the coins in the passage and carry them to the beginning of the run on the first pair of pulleys, a chute disposed adjacent the end of the run of the belts on the first pair of pulleys, a third pulley disposed between the pair of pulleys and rotatable coaxially with them, a third belt engaging a portion of the circumference of the third pulley and defining a run over that pulley terminating below the end of the run of the pairs of belts on the first pair of pulleys, said third belt lying beneath the surface of the pair of pulleys, means for driving the third belt at a speed substantially greater than the speed of the pair of belts, a guide at the end of the run of the pair of belts on the first pair of pulleys adapted to direct coins carried between the pairs of pulleys and belts into the chute, said third pulley engaging the coins as they enter the chute and accelerating them relative to coins engaged by the first pairs of pulleys and belts, an anvil disposed adjacent the other end of the chute, another pulley rotating with the third belt and drawing that belt down the chute toward the anvil, a wheel tangentially spaced from the last-named pulley and extending into the chute, said wheel rotating at the same speed as said last-named pulley and each adapted to engage opposite faces of coins and accelerate them down the chute to the anvil, and a microphone disposed adjacent the anvil.

10. A coin proving machine comprising a rotating circular horizontally disposed plate, a fixed cylindrical wall extending upwardly from the periphery of the plate and defining with the plate a container for receiving coins to be proved, a second rotating circular plate extending through an opening in the cylindrical wall and overlying a portion of the periphery of the first plate, said second plate being spaced from the first plate a distance slightly greater than the thickness of the coin to be proved, a passage defined in part by the two plates and extending through the wall for receiving coins moved by the bottom plate to the periphery of the container, said second plate directing coins away from the passage when said coins are stacked above other coins on the first plate, an idler pulley disposed in a vertical plane with its upper edge tangential to the surface of the first plate, a belt running over a portion of the circumference of said pulley and beginning at the end of the passage, means causing the belt to pick up coins in the passage and carry them over the periphery of the pulley, a chute disposed adjacent the end of the run of the belt over the pulley and adapted to receive coins which reach the end of the run, means adapted to engage the coins as they enter the chute and accelerate them down the chute and separate them from other coins carried on the pulley, an anvil disposed at the end of the chute for causing the coins to ring at their natural resonant frequency in free air after they leave the chute, and a microphone sensitive to the ring.

11. A device as defined in claim 10 further characterized by means engaging the belt before its run on the pulley for varying its distance in the passage from the surface of the first plate.

12. Means for separating a pair of overlapped coins moving along a path comprising a pair of spaced parallel pulleys, a pair of belts each engaging one of the pulleys over a circumferential run and driven at the same speed, means for causing the belt to pick up the coins in the path and carry them on the periphery of the pulleys over the run, a third pulley slightly smaller than the pair of pulleys and disposed between the pair, said third pulley being rotatable coaxially with the pair of pulleys, a third belt driven at a greater speed than the pair of belts and traveling a circumferential run on the third pulley and with its outer side lying immediately below the surface of the pair of pulleys, said circumferential run of the third belt terminating beyond the end of the run of the pair of belts, and means directing the coins against the third belt as they are released from between the pairs of pulleys and belts.

References Cited in the file of this patent

UNITED STATES PATENTS

| | | | |
|---|---|---|---|
| Re. 22,229 | Smith | Dec. 1, | 1942 |
| 686,611 | Hoey | Nov. 12, | 1901 |
| 860,960 | Broga | July 23, | 1907 |
| 869,626 | Cranner | Oct. 29, | 1907 |
| 964,848 | Bullard | July 19, | 1910 |
| 975,458 | Rees | Nov. 15, | 1910 |
| 1,128,561 | Webendorfer | Feb. 16, | 1915 |
| 1,169,493 | Kennedy | Jan. 25, | 1916 |
| 1,479,459 | Donnellan | Jan. 1, | 1924 |
| 1,585,242 | Hageman | May 18, | 1926 |
| 1,605,196 | Ligon | Nov. 2, | 1926 |
| 1,638,681 | Cook | Aug. 9, | 1927 |
| 1,883,493 | Berg | Oct. 18, | 1932 |
| 2,038,096 | Bresett | Apr. 21, | 1936 |
| 2,101,513 | Samuelsen | Dec. 7, | 1937 |
| 2,277,916 | Klemt | Mar 31, | 1942 |
| 2,288,014 | Mullen | June 30, | 1942 |
| 2,317,351 | Andalikiewicz | Apr. 27, | 1943 |
| 2,323,255 | Sutherland | June 29, | 1943 |
| 2,417,700 | McCarty | Mar. 18, | 1947 |
| 2,642,974 | Ogle | June 23, | 1953 |
| 2,646,215 | Stovall | July 21, | 1953 |
| 2,646,805 | Anderson | July 28 | 1953 |
| 2,770,343 | Andrews | Nov. 13, | 1956 |
| 2,869,777 | Share | Jan. 20, | 1959 |

FOREIGN PATENTS

| | | | |
|---|---|---|---|
| 944 | Austria | Feb. 26, | 1900 |
| 1,194 | Great Britain | of | 1871 |
| 722,587 | France | Mar. 22, | 1932 |